United States Patent
Matsushita et al.

(10) Patent No.: US 9,995,862 B2
(45) Date of Patent: Jun. 12, 2018

(54) OPTICAL FILTER, OPTICAL FILTER MODULE, SPECTROMETRIC MEASUREMENT APPARATUS, AND OPTICAL APPARATUS

(71) Applicant: Seiko Epson Corporation, Tokyo (JP)

(72) Inventors: Tomonori Matsushita, Chino (JP); Tatsuo Urushidani, Chino (JP)

(73) Assignee: Seiko Epson Corporation (JP)

( * ) Notice: Subject to any disclaimer, the term of this patent is extended or adjusted under 35 U.S.C. 154(b) by 0 days. days.

(21) Appl. No.: 14/848,680

(22) Filed: Sep. 9, 2015

(65) Prior Publication Data

US 2016/0003993 A1 Jan. 7, 2016

Related U.S. Application Data

(62) Division of application No. 13/117,296, filed on May 27, 2011.

(30) Foreign Application Priority Data

Jul. 6, 2010 (JP) ................. 2010-154158

(51) Int. Cl.
G02B 5/28 (2006.01)
G02B 26/00 (2006.01)
G01J 3/26 (2006.01)

(52) U.S. Cl.
CPC ............... *G02B 5/288* (2013.01); *G01J 3/26* (2013.01); *G02B 5/284* (2013.01); *G02B 26/001* (2013.01)

(58) Field of Classification Search
CPC ...................................................... G02B 5/288

(Continued)

(56) References Cited

U.S. PATENT DOCUMENTS 5,144,498 A  9/1992 Vincent
5,381,232 A  1/1995 van Wijk
(Continued)

FOREIGN PATENT DOCUMENTS

JP  11-142752  5/1999
JP  2000-028931 A  1/2000
(Continued)

OTHER PUBLICATIONS

Extended European Search Report for Application No. 11 17 2493.6 dated Oct. 7, 2011 (7 pages).

*Primary Examiner* — Tarifur Chowdhury
*Assistant Examiner* — Omar Nixon
(74) *Attorney, Agent, or Firm* — Harness, Dickey & Pierce, P.L.C.

(57) ABSTRACT

An optical filter includes: a first variable wavelength bandpass filter that can extract light of a first wavelength band (400 to 460 nm), the first wavelength band having a first spectral band having a central wavelength equal to a first wavelength in the first wavelength band and a second spectral band having a central wavelength equal to a second wavelength in the first wavelength band; and a second variable wavelength bandpass filter that can extract light of a second wavelength band (480 to 540 nm) adjacent to the first wavelength band, the second wavelength band having a third spectral band having a central wavelength equal to a third wavelength in the second wavelength band and a fourth spectral band having a central wavelength equal to a fourth wavelength in the second wavelength band.

7 Claims, 16 Drawing Sheets

(58) Field of Classification Search
USPC .......................................... 359/578; 356/419
See application file for complete search history.

(56) References Cited

U.S. PATENT DOCUMENTS

| | | |
|---|---|---|
| 2003/0116711 A1 | 6/2003 | Hara et al. |
| 2004/0027671 A1 | 2/2004 | Wu et al. |
| 2004/0207898 A1 | 10/2004 | Lin et al. |
| 2007/0242358 A1* | 10/2007 | Lin .......................... G01J 3/26 359/578 |
| 2010/0142067 A1 | 6/2010 | Hanamura et al. |
| 2011/0290982 A1* | 12/2011 | Boutami ................ G02B 5/201 250/208.1 |

FOREIGN PATENT DOCUMENTS

| | | |
|---|---|---|
| JP | 2001-228022 A | 8/2001 |
| JP | 2010-139552 A | 6/2010 |
| WO | WO-03-038482 A2 | 5/2003 |

* cited by examiner

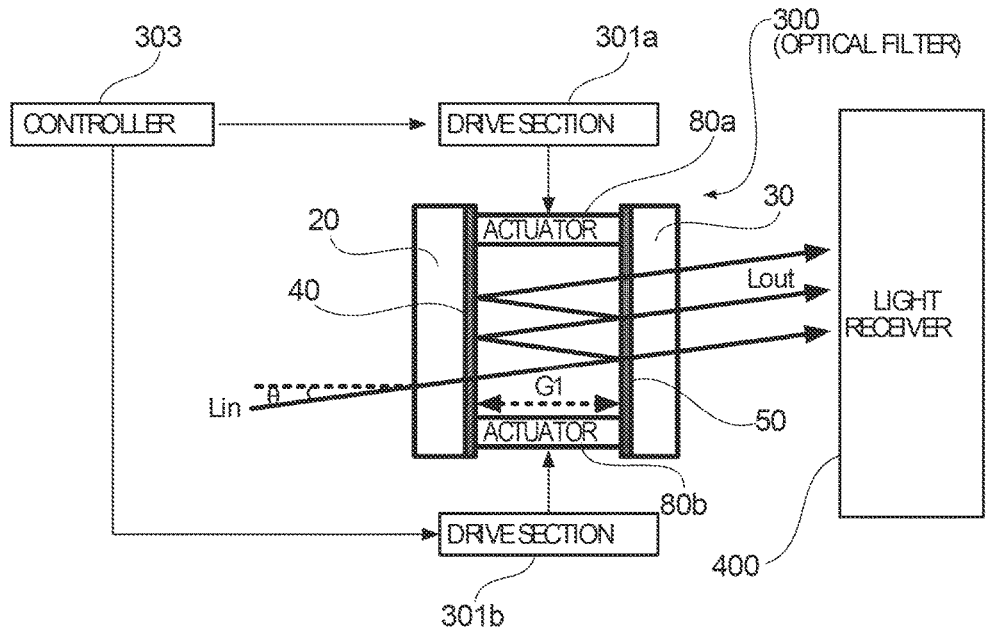
FIG. 2A
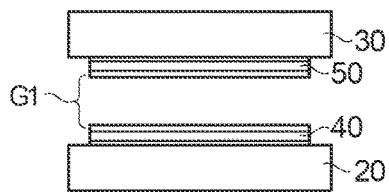
FIG. 2B
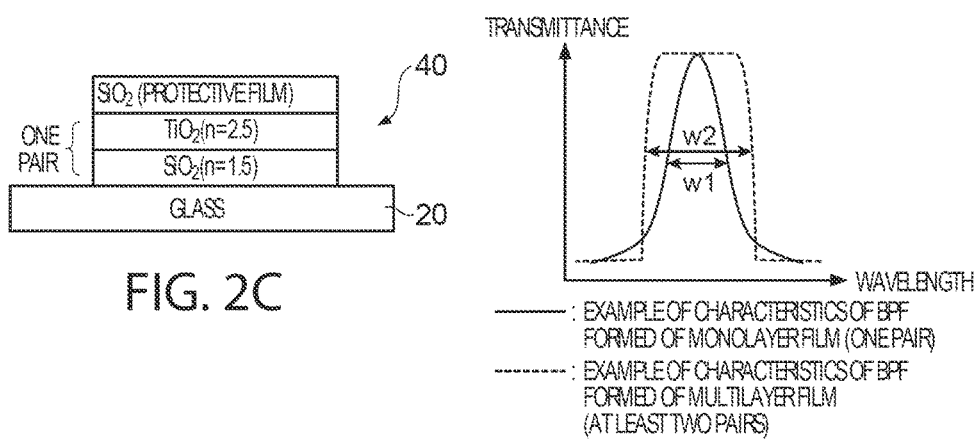
FIG. 2C
FIG. 2D

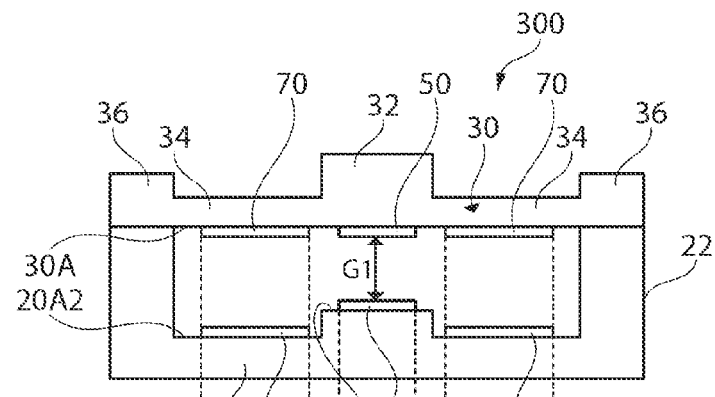
FIG. 4A
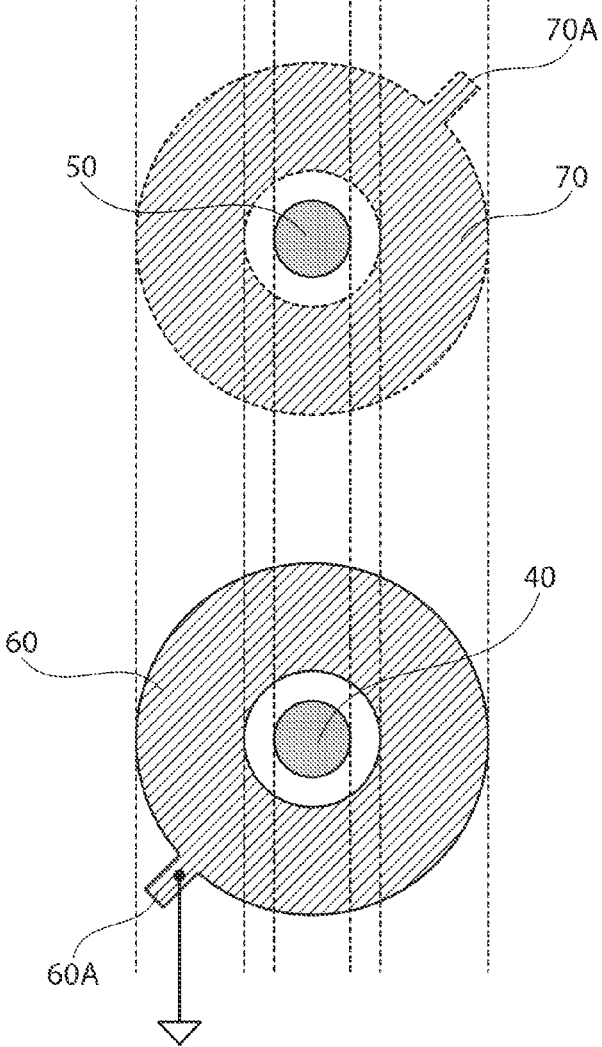
FIG. 4B
FIG. 4C

FIG. 10A

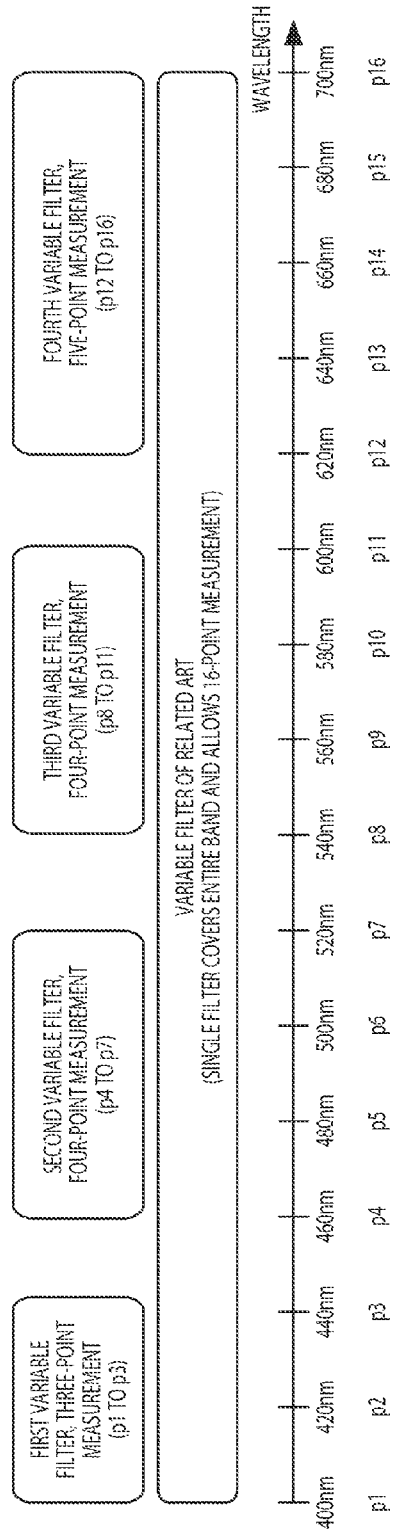

FIG. 10B

EXAMPLE OF CHARACTERISTICS OF A PLURALITY OF VARIABLE FILTERS.
(SHORTEST WAVELENGTH λ1 AND LONGEST WAVELENGTH λ2 IN EACH BAND ENSURE NECESSARY BAND).
CHARACTERISTICS CALCULATED WHEN LIGHT IS EXTRACTED UNDER CONDITIONS OF nH=2.5, nL=1.5, AND BANDWIDTH OF 20 nm

|  | FIRST VARIABLE FILTER | SECOND VARIABLE FILTER | THIRD VARIABLE FILTER | FOURTH VARIABLE FILTER |
|---|---|---|---|---|
| $\lambda_0$[nm] | 420 | 490 | 570 | 660 |
| NECESSARY BAND [nm] | 400~440 | 460~520 | 540~600 | 620~700 |
| $\lambda_1$[nm] | 362 | 422 | 491 | 569 |
| $\lambda_2$[nm] | 501 | 584 | 679 | 787 |
| $\Delta\lambda$ | 139 | 162 | 188 | 218 |

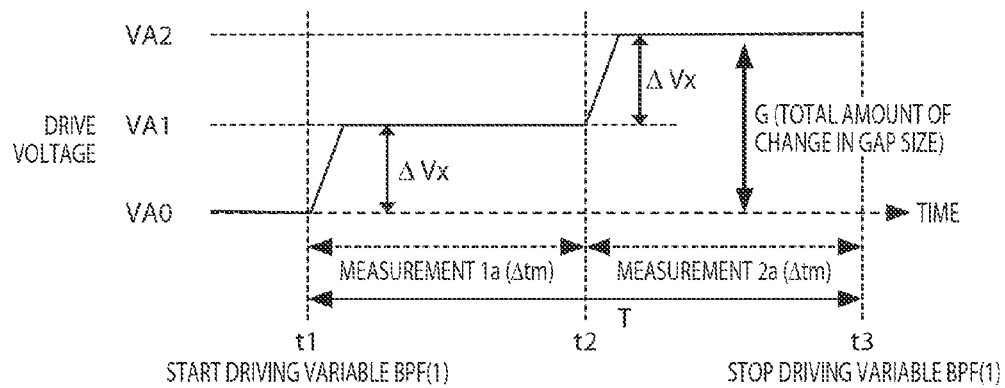
FIG. 12A
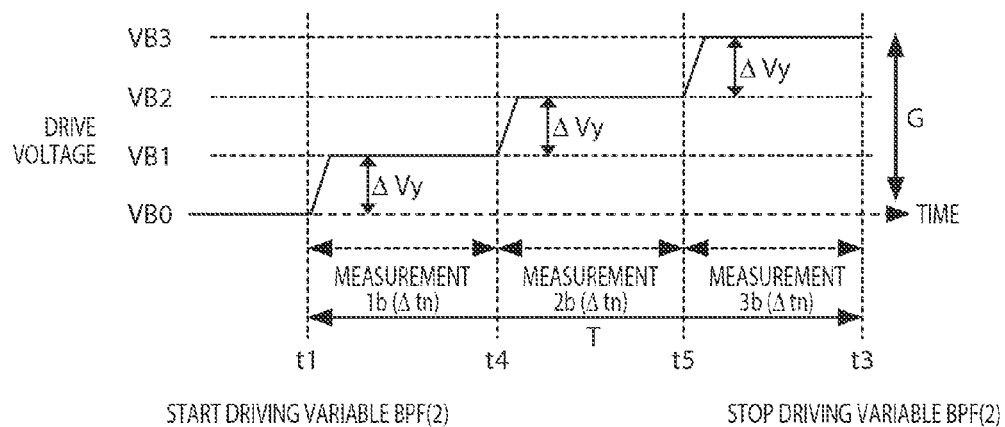
FIG. 12B
A CASE WHERE THREE VARIABLE WAVELENGTH FILTERS ARE USED
W1L<W2L<W3L
m<n<s
AMOUNT OF CHANGE IN GAP SIZE AT A TIME: G/m>G/n>G/s
(G: TOTAL AMOUNT OF CHANGE IN GAP SIZE)
AMOUNT OF CHANGE IN DRIVE VOLTAGE: ΔVx>ΔVy>ΔVz
MEASUREMENT PERIOD FOR EACH GAP SIZE: Δtm>Δtn>Δts
TOTAL MEASUREMENT PERIOD T≡m Δtm≡n Δtn≡s Δts
FIG. 12C

OPTICAL FILTER, OPTICAL FILTER MODULE, SPECTROMETRIC MEASUREMENT APPARATUS, AND OPTICAL APPARATUS This application is a divisional of U.S. application Ser. No. 13/117,296 filed May 27, 2011, which claims priority to Japanese Patent Application No. 2010-154158 filed Jul. 6, 2010. The disclosures of the above applications are incorporated herein by reference.

BACKGROUND

1. Technical Field

The present invention relates to an optical filter, an optical filter module, a spectrometric measurement apparatus, an optical apparatus, and other apparatuses.

2. Related Art

An interference filter has been used in a spectrometric measurement apparatus and other optical apparatuses. A known aspect of the interference filter selects a wavelength of light that passes therethrough (Fabry-Perot etalon interference filter) (see JP-A-11-142752, for example). A transmissive variable wavelength interference filter described in JP-A-11-142752 (hereinafter sometimes referred to as a variable gap etalon filter or simply referred to as a variable gap etalon), which can select the wavelength of light passing therethrough, includes a pair of substrates held in parallel to each other and a pair of multilayer films (optical films) formed on the pair of substrates so that the multilayer films (optical films) face each other and have a fixed-distance gap therebetween. The interference filter selects the wavelength of light passing therethrough by using an external force to change the size of the gap between the pair of multilayer films (optical films).

When a single variable wavelength filter (variable gap etalon filter, for example) is used to cover a desired wavelength band and the transmitted light has a wide wavelength range, an actuator is required to move a movable portion of the variable wavelength filter over a long distance. The moving of the movable portion disadvantageously increases the moving range of the movable portion of the variable wavelength filter and hence increases the voltage for driving the movable portion.

Another problem with a wide wavelength range of the transmitted light is that the structure of the optical films for providing a necessary band of the variable wavelength filter is complicated. In other words, the optical films need to be designed so that the entire desired wavelength band can be covered, resulting in a complicated structure of the optical films. When the structure of the optical films is complicated, it increases a burden related to manufacturing processes and decreases the intensity of the transmitted light. Other inconveniences also tend to occur.

SUMMARY

An advantage of some aspects of the invention is, for example, an ability to reduce the moving range of a variable wavelength filter. Another advantage of some aspects of the invention is, for example, an ability to suppress the degree of complication of the structure of an optical film.

(1) According to an aspect of the invention, there is provided an optical filter including a first variable wavelength bandpass filter, a second variable wavelength bandpass filter, a driver that drives each of the first and second variable wavelength bandpass filters, and a controller that variably controls a spectral band of each of the first and second variable wavelength bandpass filters. The first variable wavelength bandpass filter can extract light of a first wavelength band located in a desired wavelength band, and the first wavelength band has at least the following spectral bands: a first spectral band having a central wavelength equal to a first wavelength in the first wavelength band and a second spectral band having a central wavelength equal to a second wavelength in the first wavelength band. The second variable wavelength bandpass filter can extract light of a second wavelength band located in the desired wavelength band and adjacent to the first wavelength band, and the second wavelength band has at least the following spectral bands: a third spectral band having a central wavelength equal to a third wavelength in the second wavelength band and a fourth spectral band having a central wavelength equal to a fourth wavelength in the second wavelength band.

In this aspect of the invention, a desired wavelength band is not covered with a single variable wavelength filter but is covered with a plurality of (that is, at least two) variable wavelength bandpass filters. In other words, at least first and second variable wavelength bandpass filters are provided. The first variable wavelength bandpass filter can extracts light of a first wavelength band located in the desired wavelength band. The second variable wavelength bandpass filter can extract light of a second wavelength band located in the desired wavelength band and adjacent to the first wavelength band.

Each of the first and second variable wavelength bandpass filters can, for example, be formed of a variable gap etalon filter. Changing the size of a gap in the variable gap etalon allows a single optical filter to effectively provide a plurality of (that is, at least two) spectral bands. In other words, the first variable wavelength bandpass filter has at least the following spectral bands: a first spectral band having a central wavelength equal to a first wavelength in the first wavelength band and a second spectral band having a central wavelength equal to a second wavelength (for example, a wavelength shifted from the first wavelength along the wavelength axis by at least the bandwidth of the first spectral band) in the first wavelength band. Similarly, the second variable wavelength bandpass filter has at least the following spectral bands: a third spectral band having a central wavelength equal to a third wavelength in the second wavelength band and a fourth spectral band having a central wavelength equal to a fourth wavelength (for example, a wavelength shifted from the third wavelength along the wavelength axis by at least the bandwidth of the third spectral band) in the second wavelength band.

A variable wavelength bandpass filter is a single optical filter that can effectively provide a plurality of spectral bands, has a simple configuration but can cover a wide wavelength range, and has excellent usability. A plurality of variable wavelength bandpass filters is used and a spectral band is allocated to each of the filters, whereby the resultant optical filter can efficiently cover a wider wavelength range and has a simplified configuration. In this way, for example, the moving range of a movable portion of each of the variable wavelength bandpass filters can be reduced, and increase in drive voltage of an actuator can be reduced. Further, for example, the structure or the configuration (including the thickness and other parameters) of an optical film (for example, an optical film that has a structure in which constituent films having different refractive indices are stacked and has both light reflection and transmission properties) used in each of the variable wavelength bandpass filters can be simplified. According to this aspect of the invention, a burden related to designing the optical filter (design burden) and a burden related to manufacturing the optical filter (process burden) can be reduced.

(2) In another aspect of the invention, the optical filter is configured such that the first variable wavelength bandpass filter includes a first substrate, a second substrate that faces the first substrate, a first optical film provided on the first substrate, a second optical film provided on the second substrate and facing the first optical film, a first electrode provided on the first substrate, and a second electrode provided on the second substrate and facing the first electrode, and wherein the first variable wavelength bandpass filter can extract light of the first spectral band or the second spectral band when a gap between the first optical film and the second optical film is changed by an electrostatic force induced between the first electrode and the second electrode. The second variable wavelength bandpass filter includes a third substrate, a fourth substrate that faces the third substrate, a third optical film provided on the third substrate, a fourth optical film provided on the fourth substrate and facing the third optical film, a third electrode provided on the third substrate, and a fourth electrode provided on the fourth substrate and facing the third electrode, and wherein the second variable wavelength bandpass filter can extract light of the third spectral band or the fourth spectral band when a gap between the third optical film and the fourth optical film is changed by an electrostatic force induced between the third electrode and the fourth electrode.

In this aspect of the invention, an electrostatically driven variable gap etalon filter is used as each of the first and second variable wavelength bandpass filters. The first variable wavelength bandpass filter includes a first substrate (fixed substrate, for example) and a second substrate (movable substrate, for example) that is disposed so as to face the first substrate. The first substrate (fixed substrate, for example) has a first electrode, which is a component of an electrostatic actuator, and a first optical film formed thereon. The second substrate (movable substrate, for example) has a second electrode, which is a component of the electrostatic actuator, disposed thereon so as to face, for example, the first substrate. The second substrate further has a second optical film formed thereon so as to face, for example, the first optical film. The first and second optical films have a function as a reflective film that is a component of an interferometer. When a predetermined potential difference is produced between the first and second electrodes, an electrostatic force (electrostatic attraction, for example) or any other similar force is induced between the electrodes. The second substrate, which is, for example, a movable substrate, has flexibility and flexes due to the electrostatic force. As a result, the size of the gap (interference gap) between the first optical film and the second optical film is changed (narrowed, for example), and the optical transmission band (that is, spectral band) of the variable gap etalon filter is changed accordingly.

The configuration and the operation of the second variable wavelength bandpass filter are the same as those of the first variable wavelength bandpass filter. Thus, the second variable wavelength bandpass filter includes a third substrate (fixed substrate, for example) and a fourth substrate (movable substrate, for example) that is disposed so as to face the third substrate. The third substrate (fixed substrate, for example) has a third electrode, which is a component of an electrostatic actuator, and a third optical film formed thereon. The fourth substrate (movable substrate, for example) has a fourth electrode, which is a component of the electrostatic actuator, disposed thereon so as to face the third electrode. The fourth substrate further has a fourth optical film formed thereon so as to face, for example, the third optical film. The third and fourth optical films have a function as a reflective film that is a component of an interferometer.

A variable gap etalon filter is a variable wavelength filter using the principle of a Fabry-Perot interferometer and suitable to achieve a simple configuration, compactness, and inexpensiveness. In this aspect of the invention, a plurality of variable gap etalon filters are used, and the filters extract light of respective different wavelength bands. Using a plurality of variable wavelength filters reduces the moving range of the actuator in each of the filters, resulting in reduction in the drive voltage (reduction in power consumption) and decrease in the amount of change in the drive voltage per drive operation. Therefore, the accuracy in the drive voltage is advantageously improved as compared with a case where the drive voltage is greatly changed. Further, the optical films can be readily designed. The design burden and the process burden can thus be reduced.

According to this aspect of the invention, an optical filter having a simplified configuration, being compact and lightweight, with an ability to cover a wide wavelength range, and excellent usability can be provided.

(3) In still another aspect of the invention, the optical filter is configured such that the first to fourth electrodes are formed as follows: the first electrode is formed around the first optical film in a plan view viewed in a substrate thickness direction of the first substrate; the second electrode is formed around the second optical film in a plan view viewed in a substrate thickness direction of the second substrate; the third electrode is formed around the third optical film in a plan view viewed in a substrate thickness direction of the third substrate; and the fourth electrode is formed around the fourth optical film in a plan view viewed in a substrate thickness direction of the fourth substrate.

In this aspect of the invention, the first and second electrodes in the first variable wavelength bandpass filter are formed around the first and second optical films, respectively. Similarly, the third and fourth electrodes in the second variable wavelength bandpass filter are formed around the third and fourth optical films, respectively. Providing the first and second electrodes around the first and second optical films and the third and fourth electrodes around the third and fourth optical films as described above allows electrostatic forces to be induced between the electrodes to accurately control the gap between the first and second optical films and the gap between the third and fourth optical films.

(4) In yet another aspect of the invention, the optical filter is configured such that the first, second, third, and fourth optical films are made of the same material.

In this aspect of the invention, the optical films provided in the plurality of variable wavelength bandpass filters can be made of the same material. The burden of manufacturing the optical filter can be reduced (for example, manufacturing processes can be simplified).

(5) In still yet another aspect of the invention, the optical filter is configured such that the second wavelength band is located on the longer wavelength side of the first wavelength band, and the bandwidth of the second wavelength band is wider than the bandwidth of the first wavelength band.

In this aspect of the invention, when the second wavelength band, which can be extracted by the second variable wavelength bandpass filter, is located on the longer wavelength side of the first wavelength band, which can be extracted by the first variable wavelength bandpass filter, the bandwidth of the second wavelength band is set to be wider than the bandwidth of the first wavelength band.

For example, when the optical films used in the filters are made of the same material (and have the same configuration), the bandpass filters achieved by using the same optical films tend to have narrower bandwidths as the wavelength to be extracted becomes shorter. For example, when parameters that determine the bandwidth of a bandpass filter include the wavelength itself of light passing through the bandpass filter, the wavelength becomes shorter, the bandwidth of the bandpass filter becomes narrower. For example, assume now a case where a spectrometric measurement apparatus needs to have eight spectral bands each of which has a predetermined bandwidth and four spectral bands are allocated to each of first and second spectral bands. In this case, the fact described above may cause the first wavelength band on the shorter wavelength side to be narrower than the second wavelength band so that it is difficult to allocate four spectral bands to the first wavelength band (that is, may make it difficult to provide four measurement points). To address the problem, the optical films used in the first variable wavelength bandpass filter, which extracts light of a wavelength band located on the shorter wavelength side, needs to be made of a different material (and needs to employ a different structure). In this case, the burden of manufacturing the optical films increases.

This aspect of the invention addresses the problem as follows: the first and second wavelength bands are so set that they can have a difference in bandwidth. Specifically, the bandwidth of the second wavelength band located on the longer wavelength side is set to be wider than the bandwidth of the first wavelength band located on the shorter wavelength side. In this way, it is not necessary to allocate an unreasonable number of spectral bands to the first wavelength band located on the shorter wavelength side, but an optical filter having reasonable specifications can be designed.

(6) In further another aspect of the invention, the optical filter is configured such that a plurality of spectral bands each of which has a predetermined bandwidth are provided in the first wavelength band, and a plurality of spectral bands each of which has the predetermined bandwidth are provided in the second wavelength band. The number "m" of spectral bands provided in the first wavelength band and the number "n" of spectral bands provided in the second wavelength band satisfy m<n.

As described in the above aspect (5), because the bandwidth of the second wavelength band located on the longer wavelength side is set to be wider than the bandwidth of the first wavelength band located on the shorter wavelength side, it is not necessary to allocate an unreasonable number of spectral bands to the first wavelength band located on the shorter wavelength side.

In this aspect of the invention, the same number of spectral bands are not allocated to the first or second wavelength bands, but the following designing method is employed: the first wavelength band located on the shorter wavelength side has a fewer number of spectral bands set therein. That is, the number of spectral bands provided in the first wavelength band is set to "m," and the number of spectral bands provided in the second wavelength band is set to "n." In this case, the following relationship is satisfied: m<n.

For example, when seven spectral bands (seven measurement points) are required, three spectral bands (m=3) (three measurement points) are set in the first wavelength band, and four spectral bands (n=4) (four measurement points) are set in the second wavelength band. The setting described above allows light of the wavelength band located on the shorter wavelength side to be extracted by the corresponding variable wavelength bandpass filter using the same optical films and prevents the configuration of the optical filter (an optical filter apparatus including a plurality of variable wavelength bandpass filters) as a whole from being complicated, whereby the manufacturing burden and the design burden will not increase.

(7) Instill further another aspect of the invention, the optical filter is configured such that a holding period $\Delta tm$ per spectral band when the spectral band of the first variable wavelength bandpass filter is changed m times and a holding period $\Delta tn$ per spectral band when the spectral band of the second variable wavelength bandpass filter is changed n times are set to satisfy $\Delta tm > \Delta tn$.

In this aspect of the invention, a holding period per spectral band in each of the variable wavelength bandpass filters is of interest. The spectral band of the first variable wavelength bandpass filter is changed m times, and the spectral band of the second variable wavelength bandpass filter is changed n times. In this case, "m" and "n" are set to satisfy m<n, as described in the above aspect (5).

For example, assume a case where variable gap etalon filters are used as the first and second variable wavelength bandpass filters and the total travels of the movable substrates (second and fourth substrates) in the variable wavelength bandpass filters (total amounts of change in the gap size) are the same. For example, when the gap between each of the movable substrates and its counterpart is changed by "G" in total, the gap size in the first variable wavelength bandpass filter is changed by (G/m) whenever a spectral band is changed to another, and the gap size in the second variable wavelength bandpass filter is changed by (G/n) whenever a spectral band is changed to another. Since "m" is smaller than "n," (G/m) is greater than (G/n). That is, comparison between the amounts of change in the gap size in the bandpass filters whenever their spectral bands are changed shows that the amount of change in the gap size (G/m) in the first variable wavelength bandpass filter whenever its spectral band is changed is greater than the other. The amount of change in the drive voltage supplied to the actuator in the first variable wavelength bandpass filter whenever its spectral band is changed (the amount of stepwise voltage change) is therefore greater than the other. When the amount of change in the drive voltage is larger, a longer settling period (stabilizing period) is required to stabilize the drive voltage.

In view of this point, $\Delta tm$ and $\Delta tn$ are so set to satisfy $\Delta tm > \Delta tn$ in this aspect of the invention, where $\Delta tm$ is a holding period for each spectral band in the first variable wavelength bandpass filter and $\Delta tn$ is a holding period for each spectral band in the second variable wavelength bandpass filter as described above. That is, since the amount of change in the drive voltage for each transition thereof in the first variable wavelength bandpass filter is large, the settling period is set as a large value, that is, the holding period $\Delta tm$ for each spectral band is set to be longer than $\Delta tn$. As a result, when the first variable wavelength bandpass filter is driven, the settling period required to stabilize the drive voltage can be sufficiently long, whereas when the second variable wavelength bandpass filter is driven, no unnecessarily long holding period will be set, whereby light of a desired spectral band can be extracted reasonably and efficiently.

(8) In yet further another aspect of the invention, the optical filter is configured such that the controller so sets Δtm and Δtn that m×Δtm is equal to n×Δtn.

This aspect of the invention allows the periods from the points when the variable wavelength bandpass filters start extracting light to the points when the filters complete extracting the light to be substantially the same. In the above aspect (7) described above, Δtm is set to be greater than Δtn. Adjusting the lengths of Δtm and Δtn allows m×Δtm to be substantially equal to n×Δtn, whereby the periods from the points when the variable wavelength bandpass filters start extracting light to the points when the filters complete extracting the light can be substantially the same. When the periods over which the variable wavelength bandpass filters extract light are the same, for example, signal processing in a spectrometric measurement apparatus is readily performed (for example, the timings when signals are processed can readily be the same), which contributes to efficient signal processing in the spectrometric measurement apparatus or any other optical apparatus.

(9) In still yet further another aspect of the invention, the optical filter is configured such that the optical filter further includes a third variable wavelength bandpass filter that can extract light of a third wavelength band located in the desired wavelength band and adjacent to the second wavelength band. The third wavelength band is located on the longer wavelength side of the first and second wavelength bands. The bandwidth of the third wavelength band is set to be wider than the bandwidth of the first wavelength band. A plurality of spectral bands each of which has the predetermined bandwidth is provided in the third wavelength band. The number "m" of spectral bands provided in the first wavelength band, the number "n" of spectral bands provided in the second wavelength band, and the number "s" of spectral bands provided in the third wavelength band satisfy not only m<n≤s or m≤n<s but also n=m+1 when m<n or s=n+1 when n<s.

In this aspect of the invention, when at least three variable wavelength bandpass filters are used, a constraint is imposed on the number of spectral bands set to each of the variable wavelength bandpass filters (the number of settable gap sizes or the number of measurement points). That is, the number "m" of spectral bands set in the first variable wavelength bandpass filter, the number "n" of spectral bands set in the second variable wavelength bandpass filter, and the number "s" of spectral bands set in the third variable wavelength bandpass filter satisfy not only m<n≤s or m≤n<s but also the difference between "m" and "n" or the difference between "n" and "s" is set as zero or one. It is assumed that m, n, and s are natural numbers greater than or equal to two. That is, n=m+1 when m<n or s=n+1 when n<s.

For example, assume a case where the total number of spectral bands settable in an optical filter including a plurality of variable wavelength bandpass filters (the total number of settable gap sizes) is "X" (X is an even number and 16 in this description) and four variable wavelength bandpass filters are used. Further, the number of spectral bands set in a fourth variable wavelength bandpass filter is "p."

In this case, when the same number of spectral bands are allocated to each of the variable wavelength bandpass filters, four spectral bands are allocated to each of the filters. In this aspect of the invention, however, the number is set, for example, as follows: m=3, n=4, s=4, and p=5. In this example, m, n, and s satisfy m<n=s, and n, s, and p satisfy n=s<p (when n, s, and p are newly replaced with m, n, and s, respectively, the following relationship is satisfied: m=n<s).

Imposing the constraint in this aspect of the invention allows the difference in the number of spectral bands between two variable wavelength bandpass filters that extract light of adjacent wavelength bands to be zero or one (setting the difference at zero or one advantageously prevents the number of spectral bands from varying greatly), while the following principle (the principle in the above aspect (5) described above) is still maintained: the bandwidth is set to be narrow in a short wavelength area, where it is difficult to provide a wide spectral band, and the bandwidth is set to be wide in a long wavelength area. The variable wavelength bandpass filters can therefore be reasonably designed. For example, the periods over which the variable wavelength bandpass filters extract light of the spectral bands can readily be substantially the same, for example, as in the above aspect (8).

(10) According to further another aspect of the invention, there is provided an optical filter module including any of the optical filters described above and light receiving devices that receive light having passed through the optical filter.

The optical filter module can, for example, be used as a receiver (including light receiving optical systems and light receiving devices) of an optical communication apparatus or a light receiver (including light receiving optical systems and light receiving devices) of a spectrometric measurement apparatus. According to this aspect of the invention, an optical filter module having a wide wavelength range of transmitted light, compactness, and excellent usability is provided.

(11) According to a still further aspect of the invention, there is provided a spectrometric measurement apparatus including any of the optical filters described above, light receiving devices that receive light having passed through the optical filter, and a signal processor that performs predetermined signal processing based on signals provided from the light receiving devices.

According to this aspect of the invention, a spectrometric measurement apparatus having a simplified configuration, being compact and lightweight, with an ability to cover a wide wavelength range, excellent usability, and other advantages can be provided. The signal processor performs predetermined signal processing based on signals (received light signals) provided from the light receiving devices, for example, to measure a spectrophotometric distribution of a sample. Measuring a spectrophotometric distribution allows, for example, measurement of the color of the sample and analysis of components contained in the sample. It is noted that the accuracy in spectrometric measurement can be improved by performing noise removal correction on the signals provided from the light receiving devices. Further, the noise, which results from a wide full width at half maximum transmittance of each filter and other factors, is a received light component corresponding to an unwanted band and superimposed on a received light signal provided from each filter.

(12) According to a yet further aspect of the invention, there is provided an optical apparatus including any of the optical filters described above. According to this aspect of the invention, the optical apparatus (a variety of sensors and optical communication-related apparatus, for example) having a simplified configuration, being compact and lightweight, with an ability to cover a wide wavelength range, and excellent usability is provided.

BRIEF DESCRIPTION OF THE DRAWINGS

The invention will now be described with reference to the accompanying drawings, wherein like numbers reference like elements.

FIGS. 2A to 2D show the principle of a variable gap etalon filter and an example of the structure thereof.

FIGS. 4A to 4C describe the layout of electrodes and optical films in the variable gap etalon filter.

FIGS. 10A and 10B show a specific design example of characteristics of variable wavelength filters in a second embodiment.

FIGS. 12A to 12C show an example of a method for driving a plurality of variable wavelength bandpass filters.

DESCRIPTION OF EXEMPLARY EMBODIMENTS

Preferred embodiments of the invention will be described below in detail. The embodiments described below are not intended to limit the contents of the invention set forth in the claims. Further, all components described in the embodiments are not necessarily essential in the invention.
First Embodiment In a first embodiment, an example of a structure and action of an optical filter (including a plurality of variable wavelength bandpass filters) will be described with reference to an optical apparatus (a spectrometric measurement apparatus in the following description) including the optical filter. Examples of the spectrometric measurement apparatus may include a colorimeter, a spectrometric analysis apparatus, and an optical spectrum analyzer.

Figure 1A:
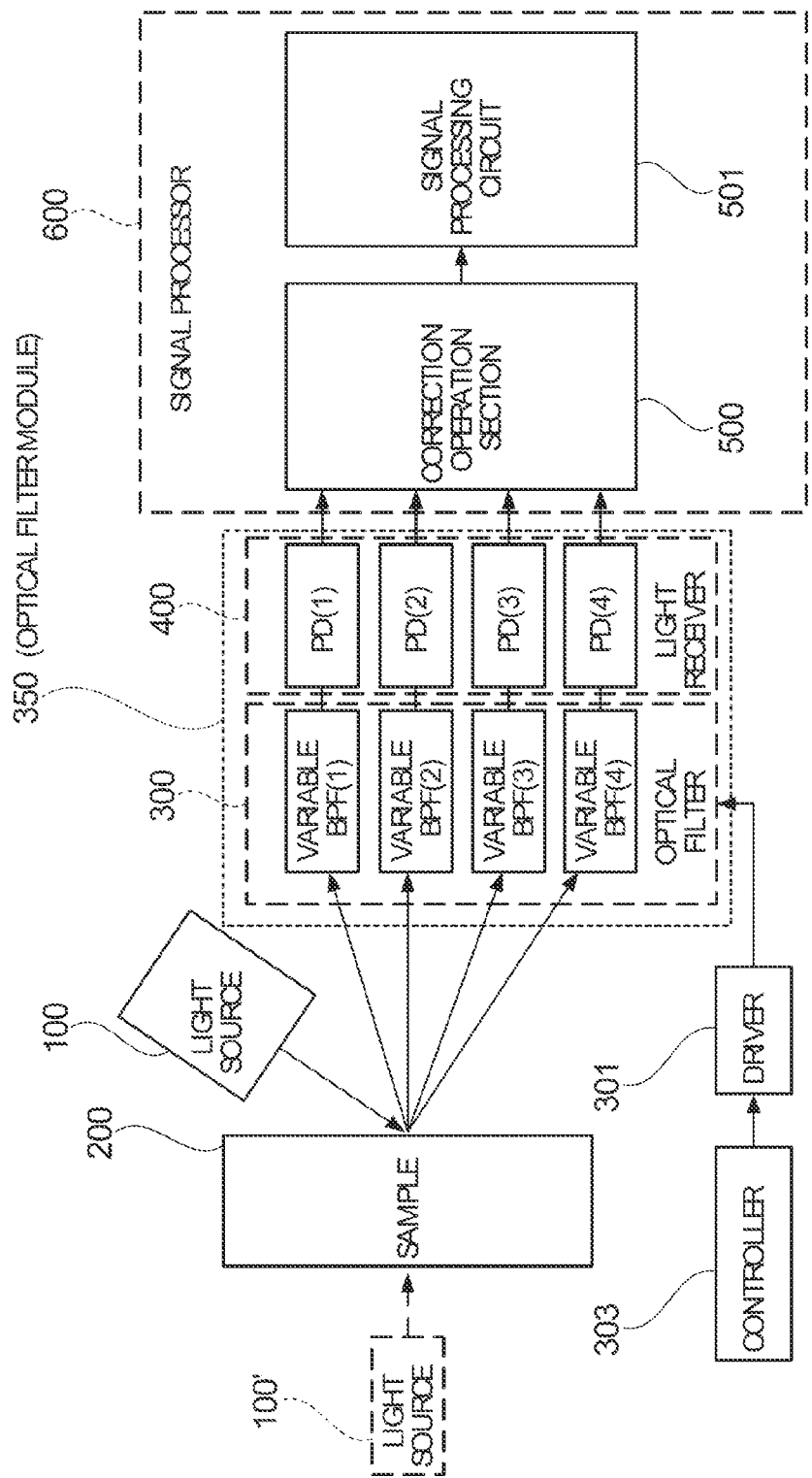
FIG. 1A shows an example of the overall configuration of a spectrometric measurement apparatus.
Figure 1B:
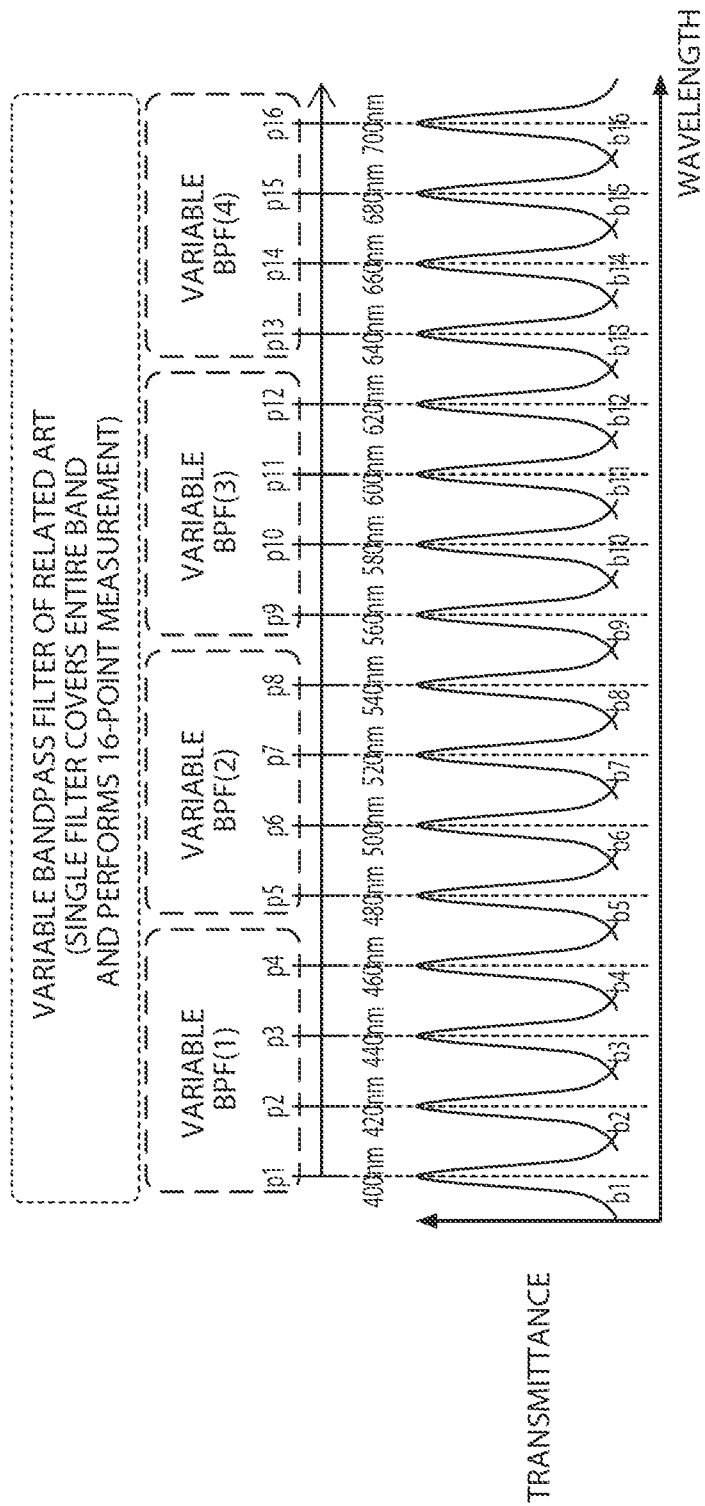
FIG. 1B shows an example of the configuration of an optical filter.

Example of Overall Configuration of Spectrometric Measurement Apparatus and Example of Configuration of Optical Filter FIG. 1A shows an example of the overall configuration of a spectrometric measurement apparatus, and FIG. 1B shows an example of the configuration of an optical filter. For example, a light source 100 is used when the color of a sample 200 is measured, and a light source 100' is used when the sample 200 is analyzed spectrometrically.

As shown in FIG. 1A, the spectrometric measurement apparatus includes the light source 100 (or 100'), an optical filter (spectrometer) 300 including a plurality of variable wavelength bandpass filters (variable BPF(1) to variable BPF(4)), a light receiver 400 including light receiving devices PD(1) to PD(4), such as photodiodes, a signal processor 600 that performs predetermined signal processing based on received light signals (light level data) provided from the light receiver 400 to determine a spectrophotometric distribution and other characteristics, a driver 301 that drives the variable BPF(1) to variable BPF(4), and a controller 303 that variably controls a spectral band of each of the variable BPF(1) to variable BPF(4). The signal processor 600 includes a signal processing circuit 501 and can further include a correction operation section 500 as required. Measuring a spectrophotometric distribution allows measurement of the color of the sample 200, analysis of the components of the sample 200, and other operation.

The optical filter 300 and the light receiver 400 form an optical filter module 350. The optical filter module 350 can be used not only in a spectrometric measurement apparatus, but also, for example, as a receiver (including light receiving optical systems and light receiving devices) in an optical communication apparatus (the latter will be described later with reference to FIG. 15). The optical filter module 350 in the present embodiment has advantages of a wide wavelength range of transmitted light, being compact and lightweight, and excellent usability.

The signal processor 600 can include the correction operation section 500 that corrects received light signals (light level data) provided from the light receiver 400, as described above. For example, the accuracy in spectrometric measurement can be improved by performing noise removal correction on signals provided from the light receiver 400. The noise, which results from a wide full width at half maximum transmittance of each of the variable BPF(1) to BPF(4) and other factors, is a received light component corresponding to an unwanted band and superimposed on a received light signal provided from each of the filters.

The light source 100 (100') may be formed, for example, of an incandescent lamp, a fluorescent lamp, a discharge lamp, an LED, or any other solid-state light-emitting device (solid-state light-emitting device light source).

As shown in FIG. 1B, the optical filter 300 is a bandpass filter that effectively covers a wide wavelength band (that is, desired band) ranging from 400 to 700 nm and allows a plurality of spectral bands to be set. In other words, the optical filter 300 includes a first variable wavelength bandpass filter (variable BPF(1)), a second variable wavelength bandpass filter (variable BPF(2)), a third variable wavelength bandpass filter (variable BPF(3)), and a fourth variable wavelength bandpass filter (variable BPF(4)).

The first variable wavelength bandpass filter (variable BPF(1)) extracts light of a wavelength band ranging from 400 to 460 nm (first wavelength band) and has four spectral bands (transmission wavelength bands) b1 to b4, each of which has a bandwidth of 20 nm, set in the wavelength band. The central wavelengths of the bands b1 to b4 are 400, 420, 440, and 460 nm, respectively. The second variable wavelength bandpass filter (variable BPF(2)) extracts light of a wavelength band ranging from 480 to 540 nm (second wavelength band) and has four spectral bands (transmission wavelength bands) b5 to b8, each of which has a bandwidth of 20 nm, set in the wavelength band. The central wavelengths of the bands b5 to b8 are 480, 500, 520, and 540 nm, respectively. The third variable wavelength bandpass filter (variable BPF(3)) extracts light of a wavelength band ranging from 560 to 620 nm (third wavelength band) and has four spectral bands (transmission wavelength bands) b9 to b12, each of which has a bandwidth of 20 nm, set in the wavelength band. The central wavelengths of the bands b9 to b12 are 560, 580, 600, and 620 nm, respectively. The fourth variable wavelength bandpass filter (variable BPF(4)) extracts light of a wavelength band ranging from 640 to 700 nm (fourth wavelength band) and has four spectral bands (transmission wavelength bands) b13 to b16, each of which has a bandwidth of 20 nm, set in the wavelength band. The central wavelengths of the bands b13 to b16 are 640, 660, 680, and 700 nm, respectively. In FIG. 1B, p1 to p16 represent measurement points set when the optical filter 300 is used in the spectrometric measurement apparatus (that is, 16 measurement points are set).

The optical filter 300 in the present embodiment shown in FIGS. 1A and 1B is not formed of a single variable wavelength filter that covers the desired wavelength band (wavelength band to be covered) but is formed of a plurality of (that is, at least two) variable wavelength bandpass filters (variable BPF(1) to variable BPF(4)) that, as a whole, cover the desired wavelength band.

At least two variable wavelength bandpass filters (variable BPF(1), which is the first variable wavelength bandpass filter, and variable BPF(2), which is the second variable wavelength bandpass filter) are provided.

A variable wavelength bandpass filter is a single optical filter that can effectively provide a plurality of spectral bands, has a simple configuration but can cover a wide wavelength range, and has excellent usability. In the present embodiment, a plurality of variable wavelength bandpass filters are used and a spectral band is allocated to each of the filters, whereby the resultant optical filter can efficiently cover a wider wavelength range and has a simplified configuration. Therefore, for example, the moving range of a movable portion of each of the variable wavelength bandpass filters can be reduced, and increase in the voltage for driving an actuator can be suppressed. Further, for example, the structure or the configuration (including the thickness and other parameters) of an optical film (for example, an optical film that has a structure in which constituent films having different refractive indices are stacked and has both light reflection and transmission properties) used in each of the variable wavelength bandpass filters can be simplified. As a result, a burden related to designing the optical filter (design burden) and a burden related to manufacturing the optical filter (process burden) can be reduced.

Variable Gap Etalon Filter

Each of the variable wavelength bandpass filters (variable BPF(1) to variable BPF(4)) shown in FIGS. 1A and 1B can be formed, for example, of a variable gap etalon filter (hereinafter sometimes simply referred to as a variable gap etalon). Controlling the gap size of the variable gap etalon allows a single optical filter to effectively provide a plurality of (that is, at least two) spectral bands.

In FIG. 1B, the first variable wavelength bandpass filter (variable BPF(1)) can be formed, for example, of a variable gap etalon that can change the gap size in four steps. In other words, the first variable wavelength bandpass filter (variable BPF(1)) effectively has at least the following spectral bands: a first spectral band b1, which is part of the first wavelength band (400 to 460 nm) and has a central wavelength equal to a first wavelength of 400 nm, and a second spectral band b2, which is part of the first wavelength band (400 to 460 nm) and has a central wavelength equal to a second wavelength. The second wavelength differs from the first wavelength and is shifted from the first wavelength along the wavelength axis by at least the bandwidth of the first spectral band (that is, 20 nm). The second wavelength is 420 nm in this description. The first variable wavelength bandpass filter further has a third spectral band b3, which has a central wavelength equal to a third wavelength (440 nm) and a bandwidth of 20 nm, and a fourth spectral band b4, which has a central wavelength equal to a fourth wavelength (460 nm) and a bandwidth of 20 nm.

Similarly, the second variable wavelength bandpass filter (variable BPF(2)) can be formed of a variable gap etalon that can change the gap size in four steps. In other words, the second variable wavelength bandpass filter (variable BPF(2)) effectively has at least the following spectral bands: a fifth spectral band b5, which is part of the second wavelength band (480 to 540 nm) and has a central wavelength equal to the fifth wavelength, and a sixth spectral band b6, which is part of the second wavelength band (480 to 540 nm) and has a central wavelength equal to the sixth wavelength 500 nm. The second variable wavelength bandpass filter further has a seventh spectral band b7, which has a central wavelength equal to a seventh wavelength (520 nm) and a bandwidth of 20 nm, and an eighth spectral band b8, which has a central wavelength equal to an eighth wavelength (540 nm) and a bandwidth of 20 nm.

FIGS. 2A to 2D show the principle of the variable gap etalon filter and an example of the structure thereof. As shown in FIG. 2A, the variable gap etalon filter includes a first substrate (fixed substrate, for example) 20, a second substrate (movable substrate, for example) 30, which face each other, a first optical film 40 provided on a principal surface (front surface) of the first substrate 20, a second optical film 50 provided on a principal surface (front surface) of the second substrate 30, and actuators (electrostatic actuators or piezoelectric devices, for example) 80a and 80b sandwiched between the substrates and adjusting the gap (distance) between the substrates.

At least one of the first substrate 20 and the second substrate 30 may be a movable substrate, or both the substrates may be movable substrates. The actuators 80a and 80b are driven by drive sections (drive circuits) 301a and 301b, respectively. The operation of each of the drive sections (drive circuits) 301a and 301b is controlled by the controller (control circuit) 303.

Light Lin externally incident at a predetermined angle θ is scattered very little but passes through the first optical film 40. The light is repeatedly reflected off and between the first optical film 40 provided on the first substrate 20 and the second optical film 50 provided on the second substrate 30. As a result, optical interference occurs and only the light having a wavelength that satisfies a specific condition undergoes constructive interference. Part of the light of that wavelength having undergone the constructive interference passes through the second optical film 50 on the second substrate 30 and reaches the light receiver (light receiving devices) 400. Light of what wavelength undergoes the constructive interference depends on the size of the gap G1 between the first substrate 20 and the second substrate 30.

The wavelength band of the transmitted light can therefore be changed by variably controlling the gap G1.

FIG. 2B shows an example of a cross-sectional structure of the variable gap etalon filter. The variable gap etalon includes the first substrate 20, the second substrate 30, which face each other in parallel to each other, the first optical film 40, and the second optical film 50. The gap size (the distance between the optical films) is set as G1.

FIG. 2C shows an example of the structure of the first optical film 40 formed on the first substrate 20 (glass substrate, for example). The first optical film 40 is formed by stacking at least a pair of a silicon dioxide film ($SiO_2$ film (refractive index n=1.5)) and a titanium dioxide film ($TiO_2$ film (refractive index n=2.5)). The first optical film 40 functions not only as a reflective film but also as a light transmissive film. An oxide film is formed as a protective film on the titanium dioxide film. Adjusting the thickness of the oxide film as a protective film allows fine adjustment of the gap G1. The second optical film 50 can be similarly configured.

FIG. 2D shows change in the optical transmission characteristic of a bandpass filter when the number of pairs of stacked optical films is changed (Note that FIG. 2D is presented only by way of example). The characteristic of a bandpass filter formed of a monolayer film (a pair of films) is represented, for example, by the solid line (w1: full width at half maximum transmittance), and the characteristic of a bandpass filter formed of a multilayer film (at least two pairs of films) is represented, for example, by the dotted line (w2: full width at half maximum transmittance (w2>w1)). As seen from FIG. 2D, increasing the number of pairs that form the optical film can increase the full width at half maximum transmittance of the bandpass filter (that is, the bandwidth of the optical transmission band).

On the other hand, an attempt to cover a wide wavelength band ranging from 400 to 700 nm with a single bandpass filter, for example, shown in FIG. 1B will result in a complicated structure of the optical film and increase in the design burden and the process burden. In contrast, in the embodiment of the invention, a plurality of variable wavelength filters is used and a spectral band is allocated to each of the variable wavelength filters, as described above, whereby the burdens on each of the variable wavelength filters can be reduced.

A variable gap etalon is a variable wavelength filter having a simple configuration, compactness, and inexpensiveness. Using a plurality of variable gap etalon filters and allowing them to extract different wavelength bands reasonably provides an optical filter having a simplified configuration, being compact and lightweight, with an ability to cover a wide wavelength range, excellent usability, and other advantages.

Since the burdens on each of the plurality of variable wavelength bandpass filters are reduced, the optical films provided in the plurality of variable wavelength bandpass filters can be made of the same material. The burden of manufacturing the optical filter can therefore be reduced (for example, manufacturing processes can be simplified).

Figure 3A:
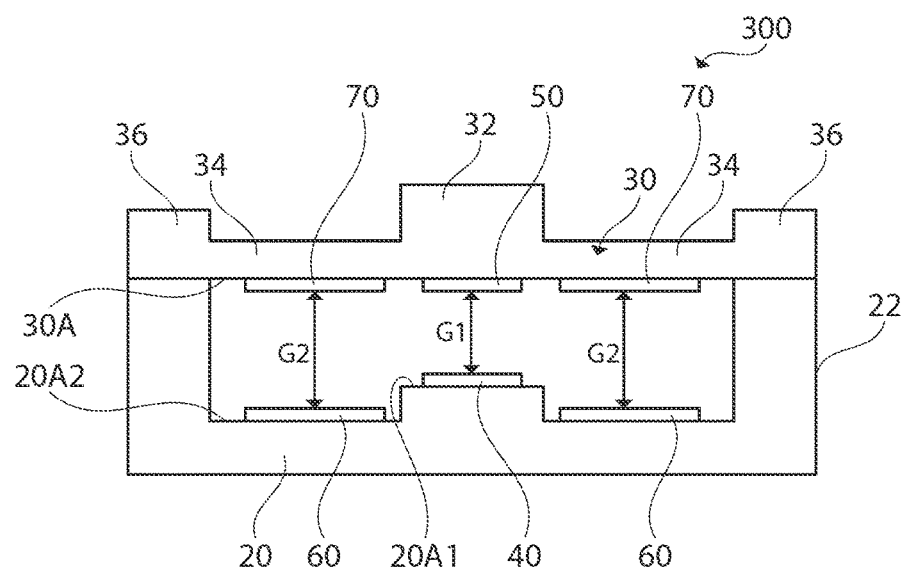
FIGS. 3A and 3B show a specific example of the structure of the variable gap etalon and describe the action thereof.
Figure 3B:
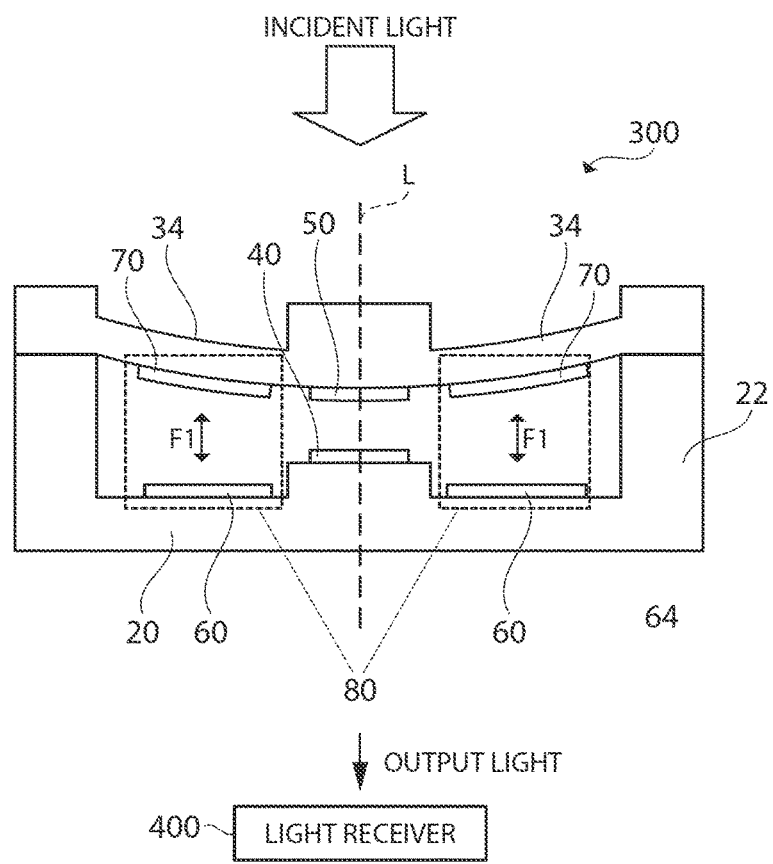

A specific example of the structure of the variable gap etalon will be described below. FIGS. 3A and 3B show a specific example of the structure of the variable gap etalon and describe the action thereof.

In FIG. 3A, a support 22 is so formed that it is integrated with or otherwise connected to the first substrate 20 and movably supports the second substrate 30. Alternatively, the support 22 may be integrated with or otherwise connected to the second substrate 30 or may be formed separately from the first and second substrates 20, 30.

Each of the first and second substrates 20, 30 can be made, for example, of soda glass, crystalline glass, quartz glass, lead glass, potassium glass, borosilicate glass, no-alkali glass, or a variety of any other suitable glass materials, or crystal quartz. Among them, each of the substrates 20 and 30 is preferably made of glass containing sodium (Na), potassium (K), or other alkali metals. When each of the substrates 20 and 30 is made of the glass material described above, the optical films (reflective films) 40, 50 and electrodes 60, 70, which will be described later, adhere to the substrates more intimately and the substrates themselves are bonded to each other more strongly. The two substrates 20 and 30 are integrated with each other, for example, by bonding them in a surface activated bonding process using a plasma polymerization film. Each of the first and second substrates 20, 30 has a square shape, and each side of the substrate is, for example, 10 mm long. The portion of the substrates that functions as a diaphragm has, for example, a diameter of 5 mm at maximum.

The first substrate 20 is formed by etching a glass base having a thickness of 500 μm or any other suitable value. The first optical film 40, which has a circular shape or any other suitable shape, is formed on the first substrate 20, specifically, on a first facing surface 20A1, which is a central portion of the facing surface that faces the second substrate 30. Similarly, the second substrate 30 is formed by etching a glass base having a thickness of 200 μm or any other suitable value. The second optical film 50, which has a circular shape or any other suitable shape and faces the first optical film 40, is formed on the second substrate 30 in a central portion of a facing surface 30A that faces the first substrate 20.

Each of the first and second optical films 40, 50 has a circular shape having a diameter of approximately 3 mm or any other suitable value. Each of the first and second optical films 40, 50 can be formed, for example, of a dielectric multilayer film obtained by stacking a $TiO_2$ film and an $SiO_2$ film, each of which has a narrow full width at half maximum transmittance and excellent resolution, or may be formed of an AgC layer or a layer made of any other suitable material. The first and second optical films 40, 50 can be formed on the first and second substrates 20, 30, respectively, in a sputtering process or by using any other suitable technique. The thickness of each of the optical films is, for example, 0.03 μm. In the present embodiment, the first and second optical films 40, 50 can extract light of a desired wavelength band from the entire visible range.

Further, an anti-reflection (AR) film (not shown) can be formed on the surface that faces away from the facing surfaces 20A1 and 20A2 of the first substrate 20 in the position corresponding to the first optical film 40. Similarly, an anti-reflection (AR) film (not shown) can be formed on the surface that faces away from the facing surface 30A of the second substrate 30 in the position corresponding to the second optical film 50. Each of the anti-reflection films is formed by alternately stacking a low refractive index film and a high refractive index film. The anti-reflection films reduce the reflectance of the surfaces of the first and second substrates 20, 30 for visible light but increase the transmittance thereof for visible light.

The first and second optical films 40, 50 are so disposed that they face each other with the gap G1, which is called a first gap G1, therebetween when no voltage is applied, as shown in FIG. 3A. In this description, the first optical film 40 is a fixed mirror and the second optical film 50 is a movable mirror, but one or both of the first and second optical films 40, 50 can be a movable mirror in accordance with the types of the first and second substrates 20, 30 described above.

A lower electrode (first electrode) 60 is formed on a second facing surface 20A2 around the first facing surface 20A1 of the first substrate 20 in a position around the first optical film 40 in a plan view. In the following description, the plan view means viewing either of the flat surfaces of either of the substrates in the thickness direction thereof. Similarly, an upper electrode (second electrode) 70 is so provided on the facing surface 30A of the second substrate 30 that the upper electrode 70 faces the lower electrode 60. The lower electrode (first electrode) 60 and the upper electrode (second electrode) 70 face each other with a second gap G2 therebetween. The surface of each of the lower electrode 60 and the upper electrode 70 can be coated with an insulating film.

In the present embodiment, the surface of the first substrate 20 that faces the second substrate 30 has the first facing surface 20A1, on which the first optical film 40 is formed, and the second facing surface 20A2, which is disposed around the first facing surface 20A1 in the plan view and on which the lower electrode 60 is formed. The first facing surface 20A1 and the second facing surface 20A2 may be flush with each other, but in the present embodiment, there is a step between the first facing surface 20A1 and the second facing surface 20A2 and the first facing surface 20A1 is set to be closer to the second substrate 30 than the second facing surface 20A2. The following relationship is therefore satisfied: first gap G1<second gap G2.

In the optical filter 300, an electrostatic force (electrostatic attraction in this description) F1 indicated by the arrows in FIG. 3B can be produced between the electrodes facing each other by applying a common voltage (ground voltage, for example) to the upper electrode 70 disposed around the second optical film 50 in the plan view and applying a voltage to the lower electrode 60 disposed around the first optical film 40 in the plan view. In other words, the lower electrode 60 and the upper electrode 70 form an electrostatic actuator 80. The electrostatic attraction F1 allows variable control of the first gap G1 between the first optical film 40 and the second optical film 50 to be smaller than an initial gap. The size of the gap between the optical films determines the wavelength of the transmitted light. Changing the size of the gap therefore allows selection of transmitted light of a desired wavelength.

As shown in FIG. 3B, incident light travels, for example, downward to the second substrate 30. Only the light of the wavelength band (spectral band) determined by the size of the gap of the variable gap etalon passes through the first substrate 20 and forms output light, which is received by the light receiver 400 and converted into an electric signal (received light signal) according to the intensity of the received light.

In FIGS. 3A and 3B, to ensure the flexibility of the second substrate 30, which is the movable substrate, the area where the upper electrode (second electrode) 70 is formed is a thin-walled portion 34 having a thickness of approximately 50 μm or any other suitable value. The thin-walled portion 34 is thinner than a thick-walled portion 32 where the second optical film 50 is disposed and a thick-walled portion 36 that is in contact with the support 22. In other words, the second substrate 30 has the flat surface 30A where the second optical film 50 and the upper electrode 70 are formed, the thick-walled portion 32 formed in a first area where the second optical film 50 is disposed, and the thin-walled portion 34 formed in a second area where the upper electrode 70 is formed. Providing the thin-walled portion 34, which ensures flexibility, and the thick-walled portion 32, which is hard to flex, thus allows the second optical film 50 to keep its flatness and the size of the gap to be changed.

FIGS. 4A to 4C describe the layout of the electrodes and the optical films in the variable gap etalon filter. FIG. 4A is a cross-sectional view of the variable gap etalon filter (reference characters are the same as those in the figures described above). FIG. 4B shows the layout of the upper electrode (second electrode) 70 and the second optical film 50 in the plan view. FIG. 4C shows the layout of the lower electrode (first electrode) 60 and the first optical film 40 in the plan view.

As clearly shown in FIGS. 4A to 4C, the first optical film 40 is provided in a central portion of the first substrate 20, and the second optical film 50 is so provided in a central portion of the second substrate 30 that the second optical film 50 faces the first optical film 40. Further, the first electrode (first drive electrode) 60 is provided on the first substrate 20 and formed around the first optical film 40 in the plan view (specifically, so formed that the first electrode 60 surrounds the first optical film 40). The second electrode (second drive electrode) 70 is provided on the second substrate 30 and formed around the second optical film 50 in the plan view (specifically, so formed that the second electrode 70 surrounds the second optical film 50). In FIGS. 4B and 4C, reference characters 70A and 60A denote extracted electrodes.

In the optical filter 300 having the structure described above, the areas where the optical films (first optical film 40 and second optical film 50) are formed differ from the areas where the electrodes (lower electrode 60 and upper electrode 70) are formed in the plan view (see FIGS. 4B and 4C), whereby the optical films and the electrodes do not overlap with each other, unlike the example described in JP-A-11-142752. In the present embodiment, in which at least one of the first and second substrates 20, 30 (the second substrate 30 in the present embodiment) is a movable substrate, the movable substrate can be flexible because the optical films and the electrodes do not overlap with each other. Further, unlike the optical filter described in JP-A-11-142752, since no optical film is formed on the lower electrode 60 or the upper electrode 70, using the optical filter 300 as a transmissive or reflective variable wavelength interference filter does not require the lower or upper electrodes 60, 70 to be transparent. Even when the lower and upper electrodes 60, 70 are made transparent, the transmission characteristic is affected in the example described in JP-A-11-142752. In contrast, in FIGS. 4A to 4C, no optical film is formed on the lower electrode 60 or the upper electrode 70, and hence no light passes through the portions where the electrodes are formed. As a result, a desired transmission characteristic is readily provided in the optical filter 300, which is a transmissive variable wavelength interference filter.

Figure 5:
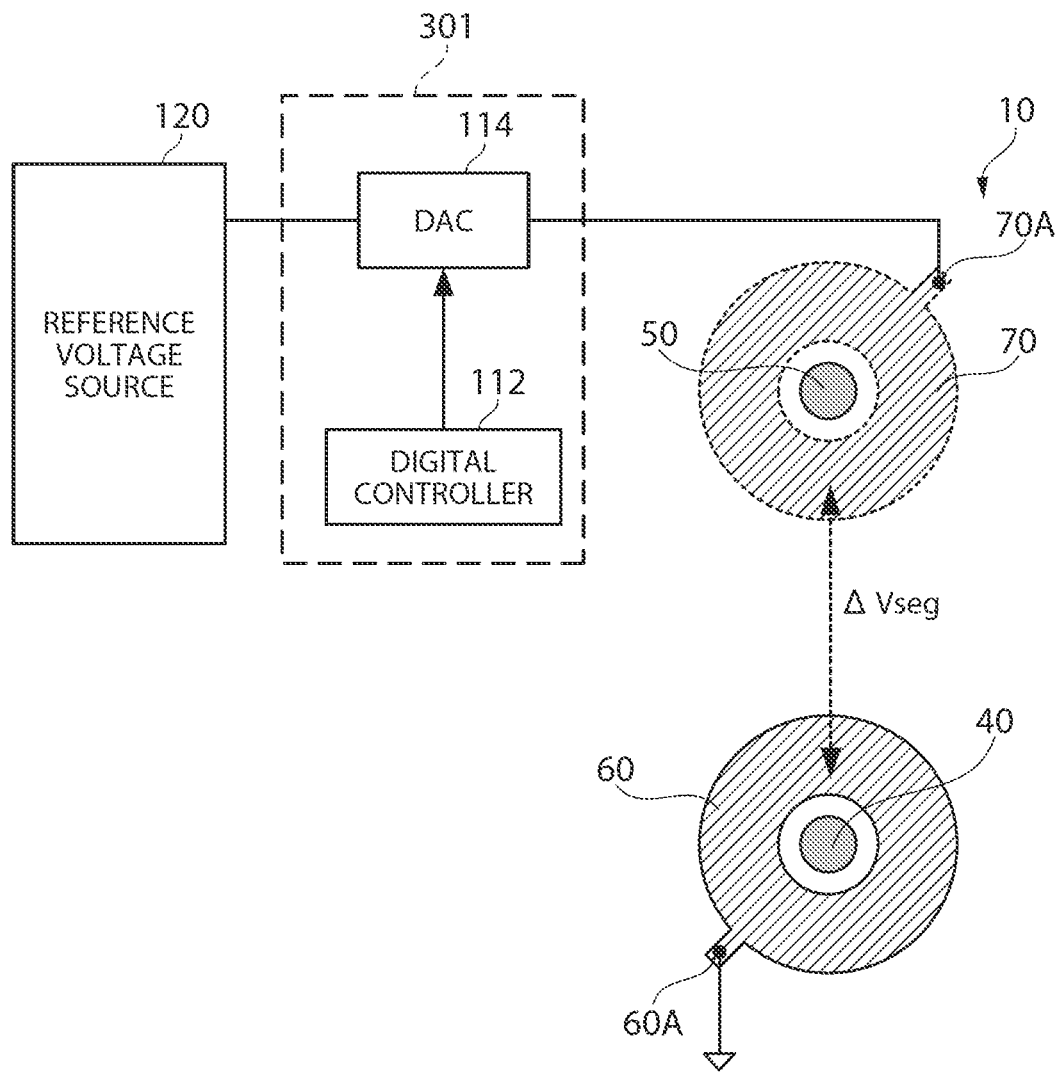
FIG. 5 describes gap control using an electrostatic actuator.

FIG. 5 describes gap control using the electrostatic actuator. The driver (drive circuit) 301 shown in FIG. 5 includes a DAC (D/A converter) 114 and a digital controller 112. The DAC (D/A converter) 114 converts a plurality of reference voltages of different values supplied from a reference voltage source 120 into respective analog voltages. Each of the analog voltages is applied as a drive voltage, for example, to the lower electrode (first electrode) 60, which is part of the electrostatic actuator. On the other hand, the potential at the upper electrode (second electrode) 70 is fixed (grounded, for example). When a potential difference ΔVseg is produced between the upper electrode (second electrode) 70 and the lower electrode (first electrode) 60, electrostatic attraction according to the potential difference is induced. As a result, the second substrate 30, which is the movable substrate, is bent, and the size of the gap between the first optical film 40 and the second optical film 50 changes (that is, the gap narrows).

Figure 6:
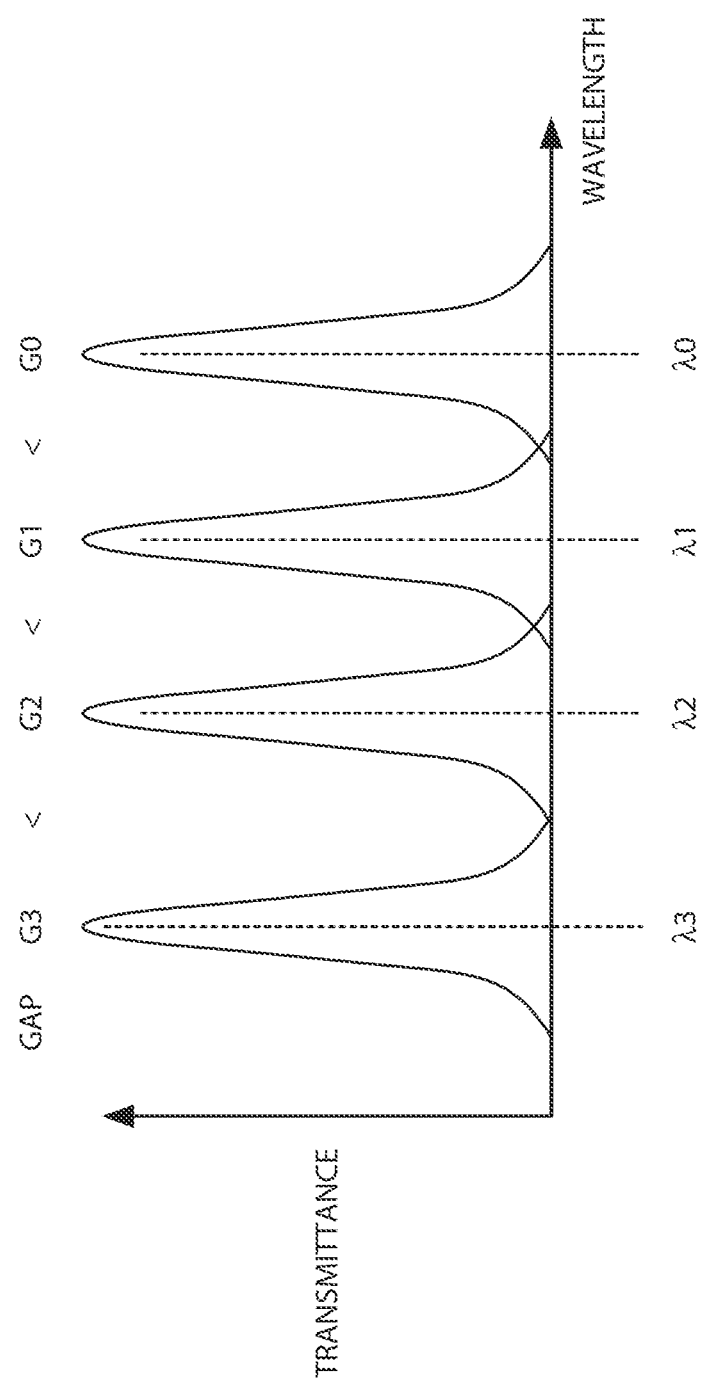
FIG. 6 shows an example of the transmission characteristic of the variable gap etalon filter capable of changing its gap size in four steps.

FIG. 6 shows an example of the transmission characteristic of the variable gap etalon filter capable of changing the gap size in four steps (that is, the number of settable gap sizes is four). FIG. 6 shows how the spectral band of the variable gap etalon changes when the gap size is changed in four steps. The relationship between the wavelength $\lambda$ ($\lambda 0$ to $\lambda 3$) of the light passing through the variable gap etalon filter and the gap size G (G0 to G3) is as follows. When the gap G is narrowed, the central wavelength $\lambda$ of the spectral band of the filter becomes shorter, as shown in FIG. 6 (in the variable gap etalon, the refractive index n of the gap is one when the gap is filled with air).

Figure 7:
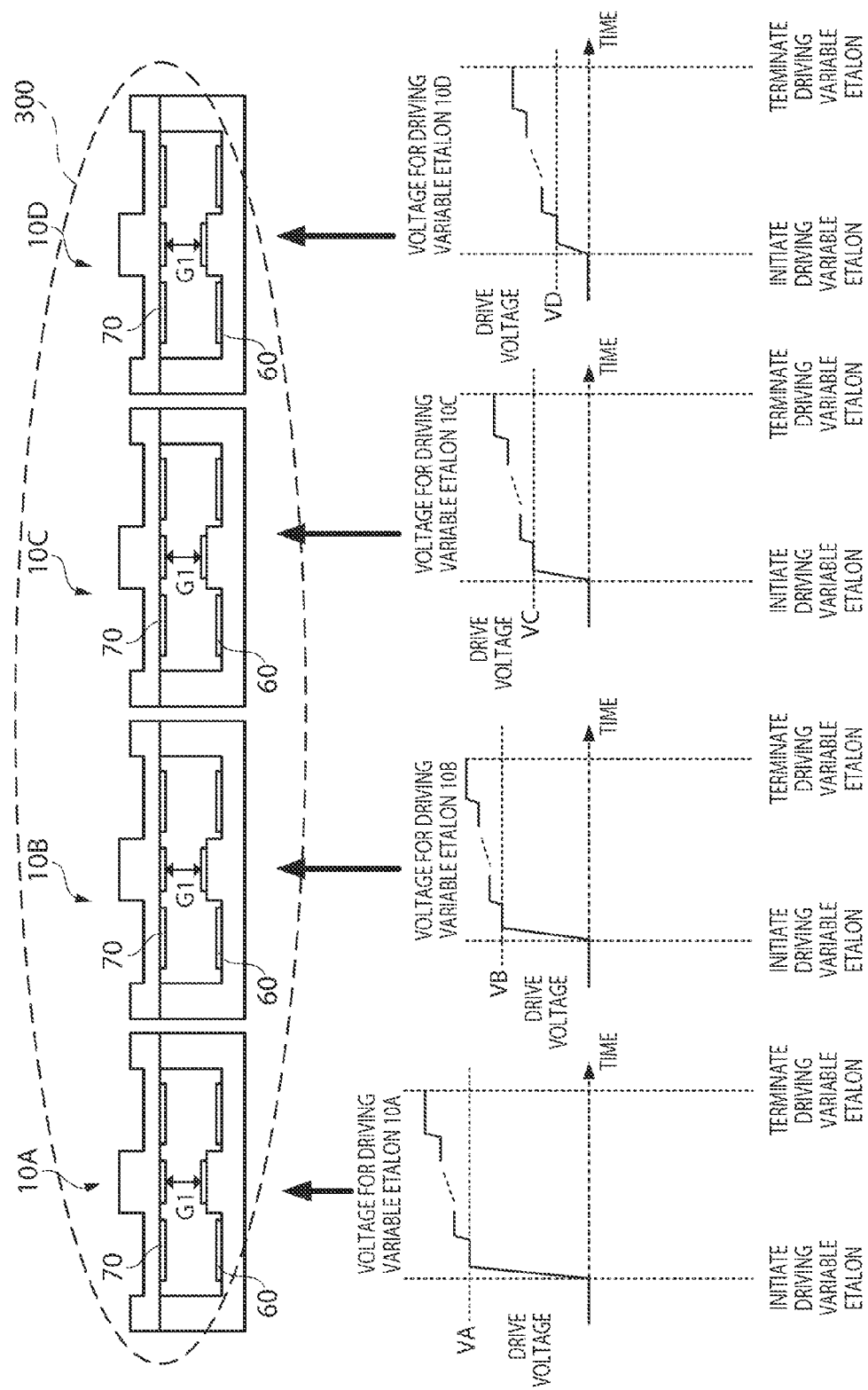
FIG. 7 shows an example of the configuration of variable gap etalon filters capable of changing the gap size in 16 steps in total and an example of a method for driving the variable gap etalon filters.

FIG. 7 shows an example of the configuration of variable gap etalon filters capable of changing the gap size in 16 steps in total and an example of a method for driving the variable gap etalon filters. In FIG. 7, four variable gap etalon filters 10A to 10D are arranged side by side. As an example, a description will be made of a case where the variable gap etalon filters 10A to 10D have the same initial gap G1 between the optical films. Each of the variable gap etalon filters 10A to 10D is a variable wavelength bandpass filter capable of changing the gap size in four steps, i.e. four settable gap sizes. The wavelengths within the wavelength band to be extracted through variable gap etalon filters 10A, 10B, 10C, and 10D become longer in this order.

The variable gap etalon filters 10A to 10D have the same initial gap G1, as described above, but receive different voltages applied immediately after the initiation of drive operation (different drive voltages). The voltages (drive voltages) applied to the filters 10A to 10D immediately after the initiation of the drive operation are VA, VB, VC, and VD, which satisfy the relationship of VA>VB>VC>VD. When the optical filter 300 having the configuration shown in FIG. 7 is used, for example, in a spectrometric measurement apparatus, spectral measurement can be performed at 16 points (p1 to p16), as shown in FIG. 1B.

Method for Determining Spectral Distribution

A description will next be made of a method for determining the spectral characteristic of the light incident on a variable wavelength bandpass filter based on a received light signal. FIGS. 8A to 8D describe a method for determining the spectral characteristic of the light incident on a variable wavelength bandpass filter.

Figure 8A:
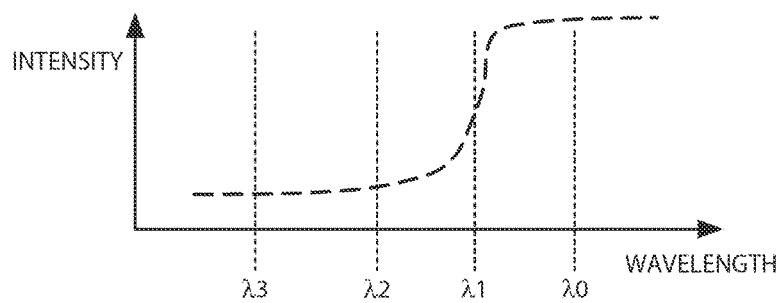
FIGS. 8A to 8D describe a method for determining the spectral characteristic of light incident on a wavelength variable bandpass filter.
Figure 8B:
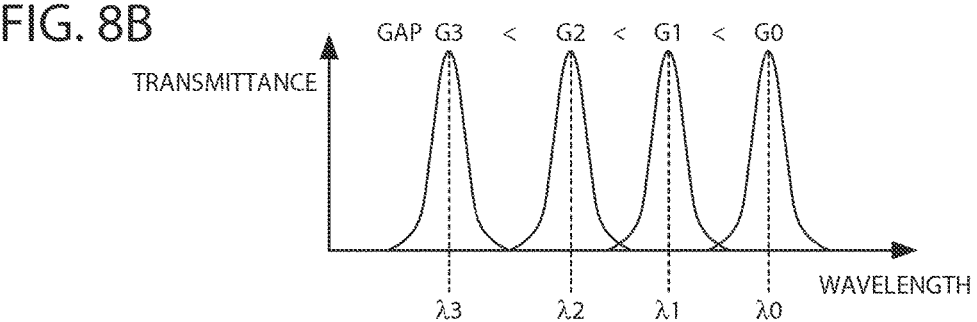

In FIG. 8A, consider a case where light having the spectral intensity distribution indicated by the thick broken line (red light, for example) is incident on a variable wavelength bandpass filter (variable gap etalon filter). The variable gap etalon filter can effectively change the gap size in four steps to achieve the four spectral bands shown in FIG. 8B. In other words, the variable gap etalon filter is a variable wavelength bandpass filter having four spectral bands and four settable gap sizes.

Figure 8C:
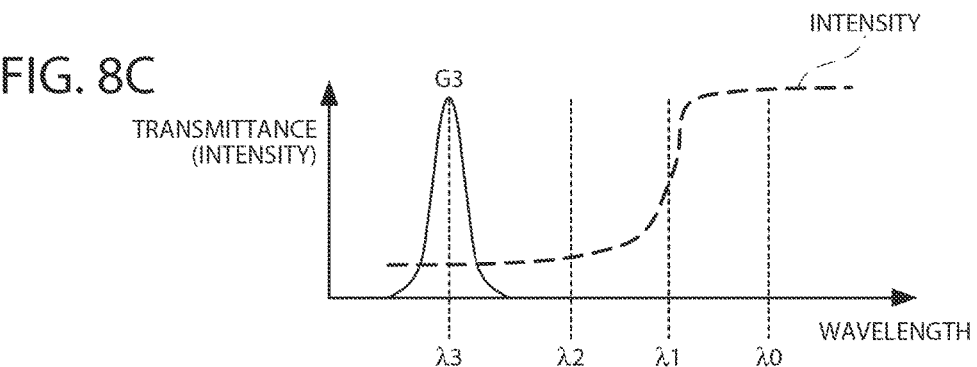
Figure 8D:
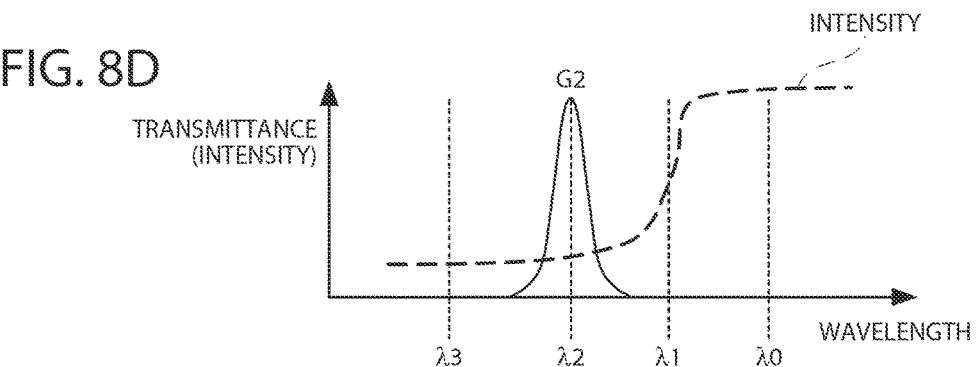

When the gap size is G3, the variable gap etalon has a transmission characteristic having a central wavelength equal to the wavelength $\lambda 3$, as shown in FIG. 8C. The level of light that reaches the light receiver (light receiving device) 400 depends on the transmission characteristic of the variable gap etalon having a central wavelength equal to the wavelength $\lambda 3$ and the intensity of the incident light (specifically, depends on the product of the transmission and the light intensity). When the gap size is G2, the variable gap etalon has a transmission characteristic having a central wavelength equal to the wavelength $\lambda 2$, as shown in FIG. 8D.

Figure 9A:
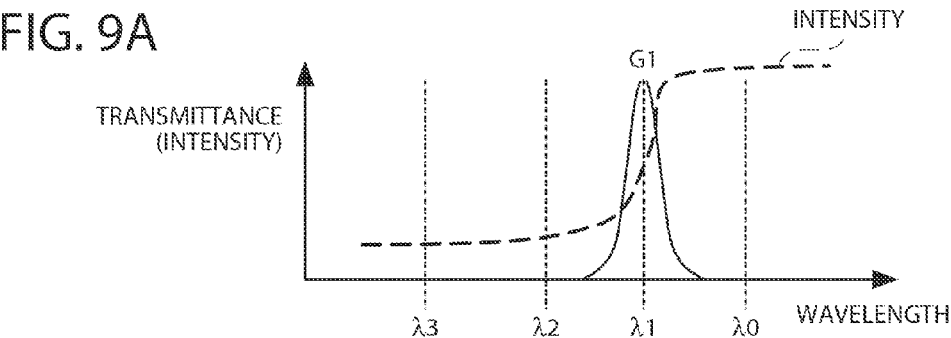
FIGS. 9A to 9D describe the method for determining the spectral characteristic of light incident on a wavelength variable bandpass filter.
Figure 9B:
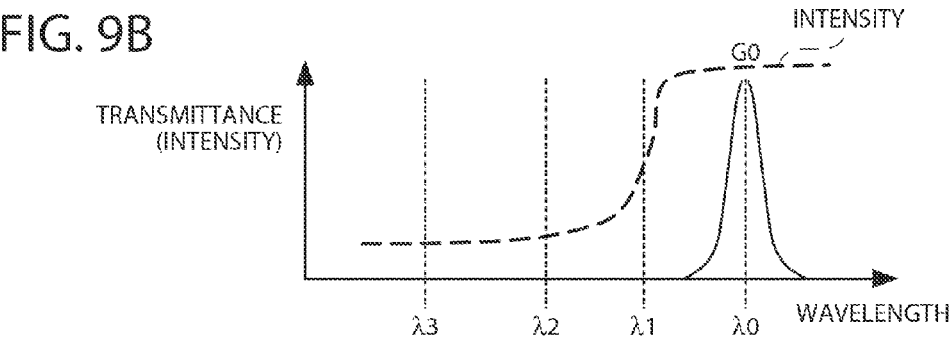

FIGS. 9A to 9D again describe the method for determining spectral characteristic of the light incident on the variable wavelength bandpass filter. When the gap size is G1, the variable gap etalon has a transmission characteristic having a central wavelength equal to the wavelength $\lambda 1$, as shown in FIG. 9A. When the gap size is G0, the variable gap etalon has a transmission characteristic having a central wavelength equal to the wavelength $\lambda 0$, as shown in FIG. 9B.

Figure 9C:
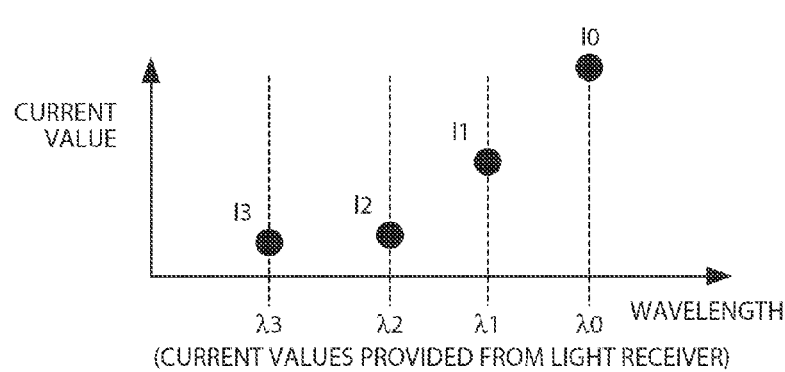
Figure 9D:
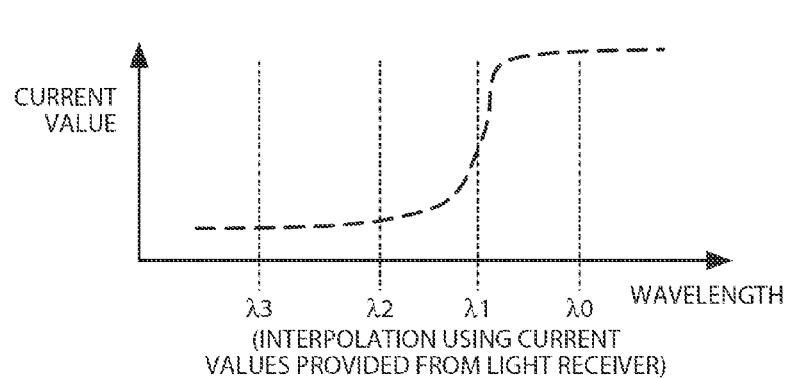

The light receiver 400 outputs currents I3 to I0 according to the received light levels, as shown in FIG. 9C. A characteristic curve representing the spectral characteristic shown in FIG. 9D can be drawn by determining the relationship between the central wavelengths $\lambda$ of the filters and the respective current values. Specifically, the spectral distribution of the incident light is detected by using the signal processor 600 (see FIG. 1A) to perform interpolation (such as linear interpolation) based on the measured data (current values) shown in FIG. 9C. The current values of the graph shown in FIG. 9D can be replaced with the intensities of the received light, which means that the spectral characteristic of the incident light has been successfully detected.

Second Embodiment

In the embodiment described above, the first wavelength band (400 to 460 nm) and the adjacent second wavelength band (480 to 540 nm) have the same bandwidth (see FIG. 1B). In contrast, in a second embodiment, the bandwidth of the first wavelength band and that of the adjacent second wavelength band are set to be different from each other. When the second wavelength band is located on a longer wavelength side of the first wavelength band, the bandwidth of the second wavelength band is set to be wider than that of the first wavelength band. The reason for this is a reflection of the fact that it is difficult for a bandpass filter to provide a wide wavelength band when it is located in a short wavelength area within the entire wavelength range.

For example, when the optical films used in the first variable wavelength bandpass filter that extracts light of the first wavelength band and the second variable wavelength bandpass filter that extracts light of the second wavelength band are made of the same material (and have the same configuration), the bandpass filters achieved by using the same optical films tend to have narrower bandwidths as the wavelength to be extracted becomes shorter. For example, when parameters that determine the bandwidth of a bandpass filter include the wavelength itself of light passing through the bandpass filter, the wavelength becomes shorter, the bandwidth of the bandpass filter becomes narrower.

For example, assume now a case where a spectrometric measurement apparatus needs to have eight spectral bands each of which has a predetermined bandwidth and four spectral bands are allocated to each of first and second spectral bands. In this case, the fact described above may cause the first wavelength band on the shorter wavelength side to be narrower than the second wavelength band, which may make it difficult to allocate four spectral bands to the first wavelength band (that is, may make it difficult to provide four measurement points). To address the problem, the optical films used in the first variable wavelength bandpass filter, which extracts light of a wavelength band located on the shorter wavelength side, needs to be made of a different material (and needs to employ a different structure). In this case, the burden of manufacturing the optical films increases.

The present embodiment addresses the problem as follows. The first and second wavelength bands are so set that they can have a difference in bandwidth. Specifically, the bandwidth of the second wavelength band located on the longer wavelength side is set to be wider than the bandwidth of the first wavelength band located on the shorter wavelength side. Therefore, it is not necessary to allocate an unreasonable number of spectral bands to the first wavelength band located on the shorter wavelength side, but an optical filter having reasonable specifications can be designed. A specific description will be made below.

Consideration of the Bandwidth of a Wavelength Band

As described above with reference to FIG. 2C, the optical film can be formed of a unit of films, that is, a pair of films having different refractive indices (stacked films). The film stacked on the upper side has a higher refractive index $n_H$, and the film stacked on the lower side has a lower refractive index $n_L$.

Consider a case where the optical film is formed by stacking a pair of films (one upper film and one lower film, two films in total), and let $\lambda_1$ be the edge (shortest) wavelength and $\lambda_2$ be the edge (longest) wavelength in the spectral band. The wavelengths $\lambda_1$ and $\lambda_2$ can be expressed by the following Equations (1) and (2), respectively.

$$\lambda_1 = \lambda_0/(1+\Delta g) \quad (1)$$

$$\lambda_2 = \lambda_0/(1-\Delta g) \quad (2)$$

In the equations, $\lambda_0$ represents the central wavelength, and $\Delta g$ is a constant given by the following Equation (3).

$$\Delta g = \frac{2}{\pi}\sin^{-1}\left(\frac{n_H - n_L}{n_H + n_L}\right) \quad (3)$$

The bandwidth $\Delta \lambda$ of the spectral band can therefore be expressed by the following Equation (4).

$$\Delta \lambda = \lambda_2 - \lambda_1 = \frac{2\Delta g}{(1+\Delta g)(1-\Delta g)}\lambda_0 \quad (4)$$

As seen from Equation (4), the bandwidth of the spectral band depends on the central wavelength $\lambda_0$ and becomes narrower as the central wavelength $\lambda_0$ becomes shorter.

As an example, consider now a case where four variable gap etalon filters are used to perform spectrometric measurement. To determine the spectral distribution of incident light for each band having a bandwidth of 20 nm across a measurement range from 400 to 700 nm, which is the visible region, it is necessary to perform measurement at 16 wavelength points. To this end, the measurement may be performed at four points for each of the variable filters, but the four-point measurement using a filter for a shorter wavelength will likely be more difficult than the measurement using a filter for a longer wavelength because Equation (4) shows that the band of the filter for a shorter wavelength is narrower than that of the filter for a longer wavelength. To address the problem, the optical films used in the filter for a shorter wavelength need to have a different structure in some cases. The present embodiment is, however, so designed that the number of measurement points provided for a filter for a longer wavelength is greater than that for a filter for a shorter wavelength. In this way, the measurement can be readily performed.

A plurality of spectral bands having a predetermined bandwidth (20 nm, for example) are provided in the first wavelength band, and a plurality of spectral bands having a predetermined bandwidth (20 nm, for example) is provided in the second wavelength band, which is located on the longer wavelength side of the first wavelength band. The number of spectral bands provided in the first wavelength band is set to m, and the number of spectral bands provided in the second wavelength band is set to n. In this case, the following relationship is satisfied: m<n.

In the present embodiment, since Equation (4) described above shows that the bandwidth of the second wavelength band located on the longer wavelength side is wider, the same number of spectral bands is not allocated to the first or second wavelength bands, but the following designing method is employed: the first wavelength band located on the shorter wavelength side has a fewer number of spectral bands set therein.

For example, when seven spectral bands (seven measurement points) are required, three spectral bands (m=3) (three measurement points) are set in the first wavelength band, and four spectral bands (n=4) (four measurement points) are set in the second wavelength band. The setting described above allows light of the wavelength band located on the shorter wavelength side to be extracted by the corresponding variable wavelength bandpass filter using the same optical films and prevents the configuration of the optical filter (an optical filter apparatus including a plurality of variable wavelength bandpass filters) as a whole from being complicated, whereby the manufacturing burden and the design burden will not increase.

In related art, a single variable wavelength filter is used to cover a wide wavelength band, in which case a wide moving range of a movable portion of the filter increases the dynamic range of the voltage for driving the movable portion and the peak of the drive voltage. Further, the optical film needs to be so designed that it can cover the entire wavelength band, resulting in a complicated structure thereof. In the present embodiment, however, a plurality of variable wavelength filters are used and different wavelength bands are allocated thereto, whereby the burden of extracting light spectrometrically on each of the variable wavelength filters can be reduced. In other words, using a plurality of variable wavelength filters reduces the measurement range of each of the filters, resulting in decrease in the moving range of the actuator, reduction in the drive voltage (reduction in power consumption), and decrease in the amount of change in the drive voltage per drive operation, whereby the accuracy in the drive voltage is advantageously improved as compared with the case where the drive voltage is greatly changed. Further, the optical films can be readily designed. The design burden and the process burden can thus be reduced.

Specific Design Example

FIGS. 10A and 10B show a specific design example of characteristics of a variable wavelength filter in the second embodiment. It is assumed in the second embodiment that the variable wavelength filter is used in a spectrometric measurement apparatus.

As shown in FIG. 10A, the optical filter as a whole covers a desired band ranging from 400 to 700 nm. In related art, a single variable wavelength filter (single variable wavelength bandpass filter) covers the entire band, whereas in FIG. 10A, four variable wavelength filters (first variable wavelength filter to fourth variable wavelength filter) are used to allocate different wavelength bands to the filters.

The first variable wavelength filter extracts light of a first wavelength band ranging from 400 to 440 nm, in which three measurement points (p1 to p3) are set. Thus, three spectral bands are set. The second variable wavelength filter extracts light of a second wavelength band ranging from 460 to 520 nm, in which four measurement points (p4 to p7) are set. Thus, four spectral bands are set. The third variable wavelength filter extracts light of a third wavelength band ranging from 540 to 600 nm, in which four measurement points (p8 to p11) are set. Thus, four spectral bands are set. The fourth variable wavelength filter extracts light of a fourth wavelength band ranging from 620 to 700 nm, in which five measurement points (p12 to p16) are set. Thus, five spectral bands are set.

FIG. 10B shows design examples of characteristics of the plurality of variable wavelength filters. FIG. 10B shows results of a simulation performed under the following conditions: each of the filters includes the same two optical films (a pair of optical films) with the upper film having a refractive index $n_H$ of 2.5 and the lower film having a refractive index $n_L$ of 1.5, and the width of each of the spectral bands is set as 20 nm.

As described above, it is difficult for the first variable wavelength filter, which extracts light of the shortest wavelength band, to provide a wide band. In the present example, however, since the number of measurement points in the first variable wavelength filter is reduced, a necessary band can be reasonably provided.

The first variable wavelength filter has a central wavelength $\lambda_0$ of 420 nm and a necessary band ranging from 400 to 440 nm. According to Equation (4) described above, the bandwidth $\Delta\lambda$ is calculated to be 139 nm because the edge wavelength $\lambda_1$ on the short wavelength side is 362 nm and the edge wavelength $\lambda_2$ on the long wavelength side is 501 nm. The wavelength band (362 to 501 nm) determined by $\lambda_1$ and $\lambda_2$ satisfies the necessary band described above (400 to 440 nm). As a result, the first variable wavelength filter, which extracts light of the shortest wavelength band, can reasonably cover the necessary band even when the filter uses the same optical films as those used in the other filters.

The other variable wavelength filters can also reasonably provide respective necessary bands. The second variable wavelength filter has a central wavelength $\lambda_0$ of 490 nm and a necessary band ranging from 460 to 520 nm. The bandwidth $\Delta\lambda$ is calculated to be 162 nm because the edge wavelength $\lambda_1$ on the short wavelength side is 422 nm and the edge wavelength $\lambda_2$ on the long wavelength side is 584 nm. The wavelength band (422 to 584 nm) determined by $\lambda_1$ and $\lambda_2$ satisfies the necessary band (460 to 520 nm).

The third variable wavelength filter has a central wavelength $\lambda_0$ of 570 nm and a necessary band ranging from 540 to 600 nm. The bandwidth $\Delta\lambda$ is calculated to be 188 nm because the edge wavelength $\lambda_1$ on the short wavelength side is 491 nm and the edge wavelength $\lambda_2$ on the long wavelength side is 679 nm. The wavelength band (491 to 679 nm) determined by $\lambda_1$ and $\lambda_2$ satisfies the necessary band (540 to 600 nm).

The fourth variable wavelength filter has a central wavelength $\lambda_0$ of 660 nm and a necessary band ranging from 620 to 700 nm. The bandwidth $\Delta\lambda$ is calculated to be 218 nm because the edge wavelength $\lambda_1$ on the short wavelength side is 569 nm and the edge wavelength $\lambda_2$ on the long wavelength side is 787 nm. The wavelength band (569 to 787 nm) determined by $\lambda_1$ and $\lambda_2$ satisfies the necessary band (620 to 700 nm).

Figure 11:
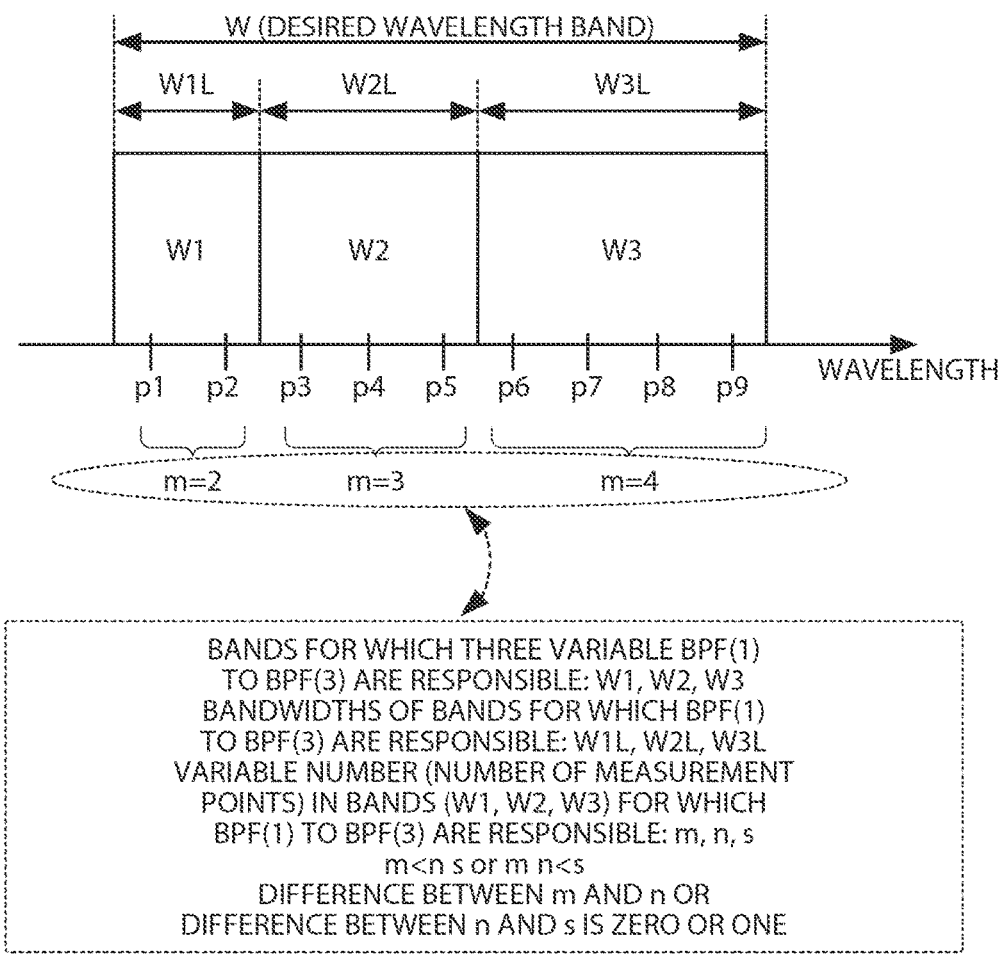
FIG. 11 shows a case where three or more variable gap etalons are used and describes a consideration of the bandwidth of light that each of the filters can extract.

Consideration of Bandwidth Determined when Three or More Variable Gap Etalons are Used FIG. 11 shows a case where three or more variable gap etalons are used and describes a consideration of the bandwidth of light extracted by each of the filters. In FIG. 11, "W" denotes a desired wavelength band. W1 denotes a first wavelength band of light extracted by a first variable wavelength bandpass filter. W2 denotes a second wavelength band of light extracted by a second variable wavelength bandpass filter. W3 denotes a third wavelength band of light extracted by a third variable wavelength bandpass filter. The bandwidths of the first to third wavelength bands are W1L, W2L, and W3L, respectively.

In the first wavelength band W1, two measurement points (p1, p2) are set. Let "m" be the number of measurement points in the first wavelength band W1 (that is, the number of spectral bands to be set). In FIG. 11, "m" is equal to 2, m=2. In the second wavelength band W2, three measurement points (p3, p4, p5) are set. Let "n" be the number of measurement points in the second wavelength band W2 (that is, the number of spectral bands to be set). In FIG. 11, "n" is equal to 3, n=3. In the third wavelength band W3, four measurement points (p6, p7, p8, p9) are set. Let "s" be the number of measurement points in the third wavelength band W3 (that is, the number of spectral bands to be set). In FIG. 11, "s" is equal to 4, s=4.

In FIG. 11, the relationship of m<n<s is satisfied and the difference in the number of spectral bands between adjacent wavelength bands is one (n=m+1, s=n+1). However, the number of spectral bands is not necessarily determined this way. For example, the number of spectral bands in a wavelength band may be equal to that in an adjacent wavelength band, as shown in the example in FIG. 10A (m=n or n=s).

In consideration of all the examples described above, the following constraint on the relationship among m, n, and s is derived: provided that m, n, and s are natural numbers greater than or equal to two, and when the number of spectral bands provided in the first wavelength band W1 is m, the number of spectral bands provided in the second wavelength band W2 is n, and the number of spectral bands provided in the third wavelength band W3 is s, not only m<n≤s or m≤n<s but also n=m+1 when m<n or s=n+1 when n<s.

Imposing the constraint on the relationship among m, n, and s allows the difference in the number of spectral bands between two variable wavelength bandpass filters that extract light of adjacent wavelength bands to be zero or one (setting the difference at zero or one advantageously prevents the number of spectral bands from varying greatly), while the following principle is still maintained: the bandwidth is set to be narrow in a short wavelength area, where it is difficult to provide a wide spectral band, and the bandwidth is set to be wide in a long wavelength area. As a result, reasonable design can be carried out. For example, when there is a large difference in the number of spectral bands to be set, periods over which the variable wavelength bandpass filters extract light of the spectral bands greatly vary from one another. In contrast, when the difference in the number of spectral bands between adjacent wavelength bands is zero or one, the periods over which the variable wavelength bandpass filters extract light of the spectral bands can, for example, readily be substantially the same.

Third Embodiment

In a third embodiment, a holding period for each spectral band in each variable wavelength bandpass filter is of interest. For example, when the spectral band of a first variable wavelength bandpass filter is changed m times, let Δtm be a holding period for each of the m spectral bands, and when the spectral band of a second variable wavelength bandpass filter is changed n times (n>m), let Δtn be a holding period for each of the n spectral bands. In this case, Δtm and Δtn are set to satisfy Δtm>Δtn.

For example, assume a case where variable gap etalon filters are used as the first and second variable wavelength bandpass filters and the total travels of the movable substrates in the variable wavelength bandpass filters (total amounts of change in the gap size), which typically differ from each other between filters having respective wavelength bands, are the same. For example, when the gap between each of the movable substrates and its counterpart is changed by G in total, the gap size in the first variable wavelength bandpass filter is changed by (G/m) whenever a spectral band is changed to another, and the gap size in the second variable wavelength bandpass filter is changed by (G/n) whenever a spectral band is changed to another. Since m is smaller than n, (G/m) is greater than (G/n). In other words, comparison between the amounts of change in the gap size in the bandpass filters whenever their spectral bands are changed shows that the amount of change in the gap size (G/m) in the first variable wavelength bandpass filter whenever its spectral band is changed is greater than the other. The amount of change in the drive voltage supplied to the actuator in the first variable wavelength bandpass filter whenever its spectral band is changed (the amount of stepwise voltage change) is therefore greater than the other. When the amount of change in the drive voltage is larger, a longer settling period (stabilizing period) is required to stabilize the drive voltage.

In view of this point, Δtm and Δtn are so set to satisfy Δtm>Δtn in the present embodiment, where Δtm is a holding period for each spectral band in the first variable wavelength bandpass filter and Δtn is a holding period for each spectral band in the second variable wavelength bandpass filter as described above. Since the amount of change in the drive voltage for each single transition thereof in the first variable wavelength bandpass filter is large, the settling period is set as a large value, that is, the holding period Δtm for each spectral band is set to be longer than Δtn. As a result, when the first variable wavelength bandpass filter is driven, the settling period required to stabilize the drive voltage can be sufficiently long, whereas when the second variable wavelength bandpass filter is driven, no unnecessarily long holding period will be set, whereby light of a desired spectral band can be extracted reasonably and efficiently.

The present embodiment further allows the periods from the points when the variable wavelength bandpass filters start extracting light to the points when the filters complete extracting the light to be substantially the same. The controller 303 (see FIG. 1A) so sets Δtm and Δtn that m×Δtm is equal to n×Δtn, whereby the periods over which the filters extract light can be substantially the same. In other words, Δtm>Δtn and m<n, m×Δtm can be substantially equal to n×Δtn by adjusting the lengths of Δtm and Δtn. When the periods over which the variable wavelength bandpass filters extract light are the same, for example, signal processing in the spectrometric measurement apparatus is readily performed, that is, the timings when signals are processed can readily be the same, which contributes to efficient signal processing in the spectrometric measurement apparatus or any other optical apparatus. The above description will be made specifically below.

FIGS. 12A to 12C show an example of a method for driving a plurality of variable wavelength bandpass filters.

First, refer to FIGS. 12A and 12B. FIG. 12A shows an exemplary voltage waveform for driving a first variable wavelength bandpass filter, and FIG. 12B shows an exemplary voltage waveform for driving a second variable wavelength bandpass filter.

In FIG. 12A, spectrometric measurement using the first variable wavelength bandpass filter (variable BPF(1)) along the temporal axis proceeds as follows: the measurement starts at time t1; the gap in the etalon is updated at time t2; and the measurement is completed at time t3. The spectrometric measurement is thus performed twice (measurement 1a and measurement 2a) in total. Now, let "T" be the period from the start of the measurement to the completion thereof, and Δtm be each measurement period (each gap holding period). Further, the drive voltages at the points of time described above have a level VA0 at the time t1, a level VA1 at the time t2, and a level VA2 at the time t3. The difference between VA1 and VA0 (and the difference between VA2 and VA1) is ΔVx, and the total amount of change in the gap size during the period from the time t1 to the time t3 is G.

In FIG. 12B, spectrometric measurement using the second variable wavelength bandpass filter (variable BPF(2)) along the temporal axis proceeds as follows: the measurement starts at the time t1; the gap in the etalon is updated for the first time at time t4, the gap in the etalon is updated for the second time at time t5, and the measurement is completed at the time t3. The spectrometric measurement is thus performed three times (measurement 1b, measurement 2b, and measurement 3b) in total. The period from the start of the measurement to the completion thereof is T as in FIG. 12A, and Δtn is each measurement period (each gap holding period). The relationship between Δtm and Δtn is Δtn<Δtm. Further, the drive voltages at the points of time described above have a level VB0 at the t1, a level VB1 at the time t4, a level VB2 at the time t5; and a level VB3 at the time t3. The difference between VB1 and VB0 (the difference between VB2 and VB1 and the difference between VB3 and VB2) is ΔVy. The relationship between ΔVx and ΔVy is ΔVy<ΔVx. The total amount of change in the gap size during the period from the time t1 to the time t3 is G.

Employing the drive voltage waveforms shown in FIGS. 12A and 12B allows the period from the start of the measurement performed by the first variable wavelength bandpass filter (variable BPF(1)) to the completion thereof to be equal to the period from the start of the measurement performed by the second variable wavelength bandpass filter (variable BPF(2)) to the completion thereof.

FIG. 12C shows an example of the holding period (measurement period) for each gap size used when a third variable wavelength bandpass filter (variable BPF(3)) is added and three filters in total are used to perform spectrometric measurement. Consider now first and second wavelength bands W1, W2 adjacent to each other and second and third wavelength bands W2, W3 adjacent to each other. The bandwidths of the first, second, and third wavelength bands W1, W2, W3 are W1L, W2L, and W3L, respectively. The number of measurement points (the number of spectral bands) in the first, second, and third wavelength bands W1, W2, W3 is m, n, and s, respectively.

When the total amount of change in the size of the gap between the movable substrate and its counterpart in each of the variable gap etalons is G, the gap size in the first variable wavelength bandpass filter (variable BPF(1)) is changed by (G/m) whenever the spectral band is changed by one step, and the gap size in the second variable wavelength bandpass filter (variable BPF(2)) is changed by (G/n) whenever the spectral band is changed by one step. Further, the gap size in the third variable wavelength bandpass filter (variable BPF(3)) is changed by (G/s) whenever the spectral band is changed by one step. (G/m), (G/n), and (G/s) satisfy the following relationship: (G/m)>(G/n)>(G/s).

The amounts of change in the drive voltage for each gap size update in the filters, $\Delta Vx$, $\Delta Vy$, and $\Delta Vz$, satisfy $\Delta Vx > \Delta Vy > \Delta Vz$. The periods $\Delta tm$, $\Delta tn$, and $\Delta ts$ over which the filters hold respective gap sizes (measurement periods per gap size) satisfy $\Delta tm > \Delta tn > \Delta ts$. The total measurement period T over which the filters perform measurement can be so set that $T \cong m \times \Delta tm \cong n \times \Delta tn \cong s \times \Delta ts$ by adjusting the lengths of $\Delta tm$, $\Delta tn$, and $\Delta ts$ as appropriate.

As described above, even when three or more filters are used, the periods from the start of measurement performed by the filters to the completion thereof can be the same by adjusting the periods of measurement per gap size performed by the filters as appropriate. As a result, for example, the timings when signals are processed can readily be the same in signal processing in a spectrometric measurement apparatus, whereby the signal processing can be performed efficiently.

Fourth Embodiment

Figure 13:
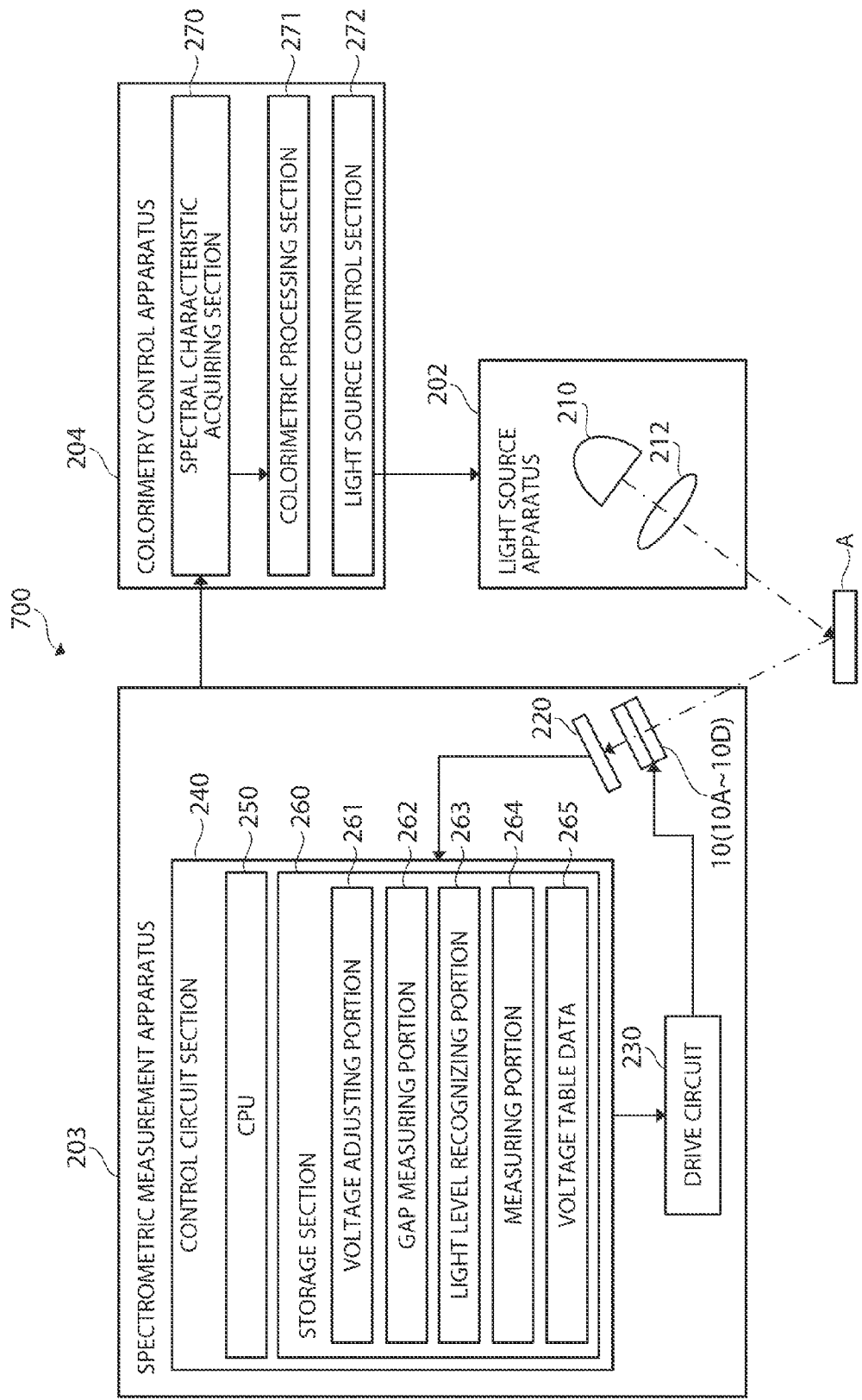
FIG. 13 is a block diagram showing a schematic configuration of a colorimeter, which is an example of an analysis apparatus according to an embodiment of the invention.

FIG. 13 is a block diagram showing a schematic configuration of a colorimeter, which is an example of an analysis apparatus according to an embodiment of the invention. In FIG. 13, a colorimeter 700 includes a light source apparatus 202, a spectrometric measurement apparatus 203, and a colorimetry control apparatus 204.

In the colorimeter 700, the light source apparatus 202 emits, for example, white light toward an object under test A, and light under test, which is the light reflected off the object under test A, is incident on the spectrometric measurement apparatus 203, which carries out spectral characteristic measurement in which the light under test undergoes a spectrometric process and the level of light of each extracted wavelength is measured. In other words, the spectral characteristic measurement is so performed that the light under test, which is the light reflected off the object under test A, is introduced into an optical filter (etalon) 10 and the level of light having passed through the etalon 10 is measured. Based on the resultant spectral characteristics, the colorimetry control apparatus 204 measures the color of the object under test A, that is, analyzes what wavelength (color) and how much amount is contained in the light under test.

The light source apparatus 202 includes a light source 210 and a plurality of lenses 212 (FIG. 13 shows only one lens) and outputs white light toward the object under test A. In the light source apparatus 202, the plurality of lenses 212 includes a collimator lens, which parallelizes the white light emitted from the light source 210, and a projection lens (not shown) outputs the parallelized light toward the object under test A.

The spectrometric measurement apparatus 203 includes the etalon 10, a light receiver 220 formed of light receiving devices, a drive circuit 230, and a control circuit section 240, as shown in FIG. 13. The spectrometric measurement apparatus 203 further includes a light incident-side optical lens (not shown) that faces the etalon 5 and guides the light reflected off the object under test A (light to be measured) into the spectrometric measurement apparatus 203.

The light receiver 220, which is formed of a plurality of photoelectric conversion devices (light receiving devices), produces electric signals according to the levels of received light. The light receiver 220, which is connected to the control circuit section 240, outputs the produced electric signals as received light signals to the control circuit section 240. The etalon 10 and the light receiver (light receiving devices) 220 can be integrated into an optical filter module.

The drive circuit 230 is connected to the lower electrode 60 and the upper electrode 70 in the etalon 10 and the control circuit section 240. The drive circuit 230 applies a drive voltage between the lower electrode 60 and the upper electrode 70 based on a drive control signal inputted from the control circuit section 240 to move the second substrate 30 to a predetermined displacement position. The drive voltage may be so applied that a desired potential difference is produced between the lower electrode 60 and the upper electrode 70. For example, a predetermined voltage may be applied to the lower electrode 60, and the upper electrode 70 may have a ground potential. The drive voltage is preferably a DC voltage.

The control circuit section 240 controls the overall operation of the spectrometric measurement apparatus 203. The control circuit section 240 includes a CPU 250 and a storage section 260, as shown in FIG. 13. The CPU 250 performs spectrometric measurement based on a variety of programs and a variety of data stored in the storage section 260. The storage section 260 includes a memory, a hard disk drive, or any other recording medium and stores the variety of programs and the variety of data, which are readable as appropriate.

The programs stored in the storage section 260 includes a voltage adjusting portion 261, a gap measuring portion 262, a light level recognizing portion 263, and a measuring portion 264. The gap measuring portion 262 may be omitted.

The storage section 260 further stores a voltage table data 265 shown in FIG. 7 that relates to voltages applied to the electrostatic actuators 80a and 80b for adjusting the first gap size G1 to the timings when the voltages are applied.

The colorimetry control apparatus 204, which is connected to the spectrometric measurement apparatus 203 and the light source apparatus 202, controls the light source apparatus 202 and performs colorimetry based on the spectral characteristics acquired from the spectrometric measurement apparatus 203. The colorimetry control apparatus 204 can, for example, be a general-purpose personal computer, a personal digital assistant, or a computer dedicated to colorimetry.

The colorimetry control apparatus 204 includes a light source control section 272, a spectral characteristic acquiring section 270, and a colorimetric processing section 271, as shown in FIG. 13. The light source control section 272 is connected to the light source apparatus 202. The light source control section 272 outputs a predetermined control signal to the light source apparatus 202 based, for example, on an input set by a user and instructs the light source apparatus 202 to emit white light of predetermined brightness. The spectral characteristic acquiring section 270 is connected to the spectrometric measurement apparatus 203 and acquires spectral characteristics inputted therefrom.

The colorimetric processing section 271 performs colorimetry in which the chromaticity of the object under test A is measured based on the spectral characteristics. For example, the colorimetric processing section 271 converts the spectral characteristics provided from the spectrometric measurement apparatus 203 into a graph and outputs the graph to a printer, a display, or any other output device (not shown).

Figure 14:
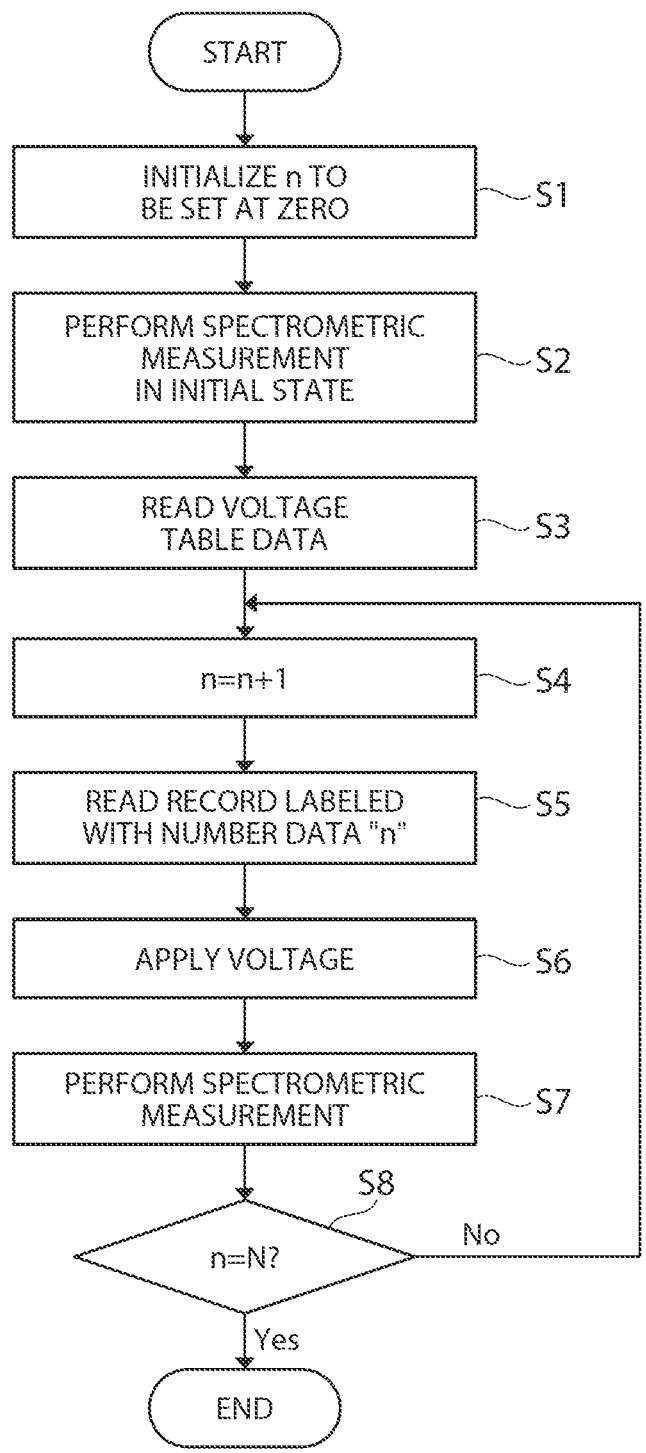
FIG. 14 is a flowchart showing an example of spectrometric measurement performed by the spectrometric measurement apparatus.

FIG. 14 is a flowchart showing an example of the spectrometric measurement performed by the spectrometric measurement apparatus 203. The CPU 250 in the control circuit section 240 first activates the voltage adjusting portion 261, the light level recognizing portion 263, and the measuring portion 264. The CPU 250 further initializes a measurement number variable n (sets n=0) to create an initial state (step S1). The measurement number variable n is an integer greater than or equal to zero.

The measuring portion 264 then measures the level of light having passed through the etalon 10 in the initial state, that is, in a state in which no voltage is applied to the electrostatic actuator 80 (step S2). The size of the first gap G1 in the initial state may be measured in advance, for example, when the spectrometric measurement apparatus is manufactured and stored in the storage section 260. The measured level of transmitted light and the size of the first gap G1 in the initial state are then outputted to the colorimetry control apparatus 204.

The voltage adjusting portion 261 then reads the voltage table data 265 stored in the storage section 260 (step S3). The voltage adjusting portion 261 adds "1" to the measurement number variable n (step S4).

The voltage adjusting portion 261 then acquires voltage data and voltage application period data used to drive the first and second electrodes 60, 70 and corresponding to the measurement number variable n from the voltage table data 265 (step S5). The voltage adjusting portion 261 then outputs a drive control signal to the drive circuit 230 to drive the electrostatic actuator 80 in accordance with the data acquired from the voltage table data 265 (step S6).

The measuring portion 264 performs spectrometric measurement at the timing when the application period has elapsed (step S7). The measuring portion 264 instructs the light level recognizing portion 263 to measure the level of the transmitted light. The measuring portion 264 outputs a spectrometric measurement result obtained by relating the measured level of the transmitted light to the wavelength thereof to the colorimetry control apparatus 204. The measurement of the light level may be so performed that the light level data corresponding to several measurement actions or all measurement actions are stored in the storage section 260 and the stored light levels are read together after the light level data corresponding to several measurement actions or all measurement actions are acquired.

The CPU 250 then judges whether or not the measurement number variable n has reached a maximum N (step S8). When the judgment result shows that the measurement number variable n is N, the CPU 250 terminates the series of spectrometric measurement. On the other hand, when the measurement number variable n is smaller than N in step S8, the CPU 250 returns to step S4, adds "1" to the measurement number variable n, and repeats the processes in steps S5 to S8.

Another Example of Optical Apparatus

Figure 15:
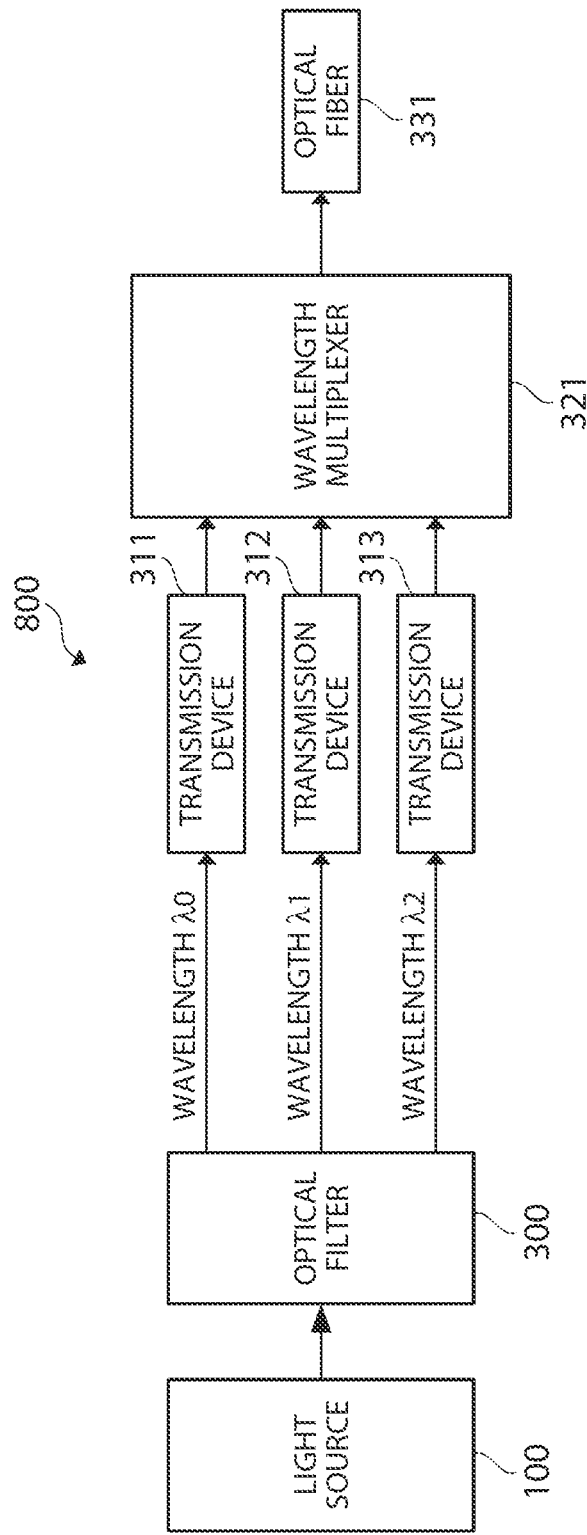
FIG. 15 is a block diagram showing a schematic configuration of a transmitter in a wavelength multiplexing communication system, which is an example of an optical apparatus according to an embodiment of the invention.

FIG. 15 is a block diagram showing a schematic configuration of a transmitter in a wavelength multiplexing communication system, which is another example of the optical apparatus according to the embodiment of the invention. Wavelength division multiplexing (WDM) communication is based on the fact that signals having different wavelengths do not interfere with each other. When a plurality of optical signals having different wavelengths is multiplexed in a single optical fiber, the amount of transmitted data can be increased without any increase in the number of optical fiber communication lines.

In FIG. 15, a wavelength multiplexing transmitter 800 includes an optical filter 300 on which light from a light source 100 is incident, and a plurality of light fluxes of wavelengths λ0, λ1, and λ2 are outputted from the optical filter 300. Transmission devices 311, 312, and 313 are provided for the respective wavelengths. Optical pulse signals corresponding to a plurality of channels from the transmission devices 311, 312, and 313 are combined in a wavelength multiplexer 321, and the combined signal is sent to a single optical fiber channel 331.

The invention is also applicable to an optical code division multiplexing (OCDM) transmitter because in OCDM, which is so designed that a channel is identified by pattern matching among coded optical pulse signals, optical pulses that form an optical pulse signal contain optical components of different wavelengths.

As described above, according to at least one of the embodiments of the invention, for example, using a plurality of variable wavelength filters allows the measurement range of each of the filters and hence the driving range of the actuator to be narrowed, whereby the voltage for driving each of the filters can be reduced. Further, for example, since the amount of change in the drive voltage for each transition thereof is reduced, the drive voltage can be more accurately controlled, whereby the drive accuracy can be improved in this sense. Moreover, for example, since the band of each of the variable wavelength filters is narrowed, the structure of the optical film is simplified. The type of useable optical film can therefore advantageously be selected more freely. Further, for example, the optical films can be made of the same material (and can have the same structure) even when a wide wavelength band needs to be covered. The design burden and the process burden can therefore be reduced. Moreover, for example, widening the bandwidth of the wavelength band located on the longer wavelength side allows the measurement wavelength range (band) necessary on the shorter wavelength side to be narrowed. The necessary band can therefore be reasonably provided on the shorter wavelength side, whereby measurement in each wavelength band can be readily performed. Further, for example, reducing the number of measurement points in a wavelength band on the shorter wavelength side allows reasonable measurement to be performed in a wavelength band on the shorter wavelength side.

The invention is preferably applicable to an optical filter, an optical filter module, a spectrometric measurement apparatus (such as colorimetric sensor and gas sensor), and an optical apparatus (such as optical communication apparatus).

Several embodiments according to the invention have been described above. Those skilled in the art can readily understand that many changes can be made to the embodiments without substantially departing from the novel features and advantageous effects of the invention. It is therefore intended that the invention encompasses all such changes. For example, a term set forth in the specification or the drawings at least once along with a different term but having a meaning in a broader sense or having the same meaning can be replaced with the different term in any location in the specification or the drawings.

What is claimed is:

1. An operating method of an optical filter comprising:
    setting a first spectral band and a second spectral band that are included in a first wavelength band;
    setting a third spectral band and a fourth spectral band that are included in a second wavelength band;
    exiting a first light of the first wavelength band from a first variable wavelength bandpass filter, the first variable wavelength bandpass filter having:
        a first set of first and second optical layers; and
        a second set of the first and second optical layers, the first set of the first and second optical layers faces the second set of the first and second optical layers via a first gap;

exiting a second light of the second wavelength band from a second variable wavelength bandpass filter, the second variable wavelength bandpass filter having:
a third set of the first and second optical layers; and
a fourth set of the first and second optical layers, the third set of the first and second optical layers faces the fourth set of the first and second optical layers via a second gap; and
setting a first reflective index of each first optical layer be smaller than a second reflective index of each second optical layer,
wherein the second wavelength band is located on a longer wavelength side of the first wavelength band, the second wavelength band is located adjacent to the first wavelength band, and a bandwidth of the second wavelength band is wider than a bandwidth of the first wavelength band, and
the second optical layer is closer to the first and second gaps than the first optical layer.

2. The operating method of an optical filter according to claim 1,
the exiting the first light of the first wavelength band from the first variable wavelength bandpass filter including:
exiting a third light of the first spectral band having a central wavelength of a first wavelength; and
exiting a fourth light of the second spectral band having a central wavelength of a second wavelength; and
the exiting the second light of the second wavelength bans from the second variable wavelength bandpass filter including:
exiting a fifth light of the third spectral band having a central wavelength of a third wavelength; and
exiting a sixth light of the fourth spectral band having a central wavelength of a fourth wavelength.

3. The operating method of an optical filter according to claim 1, wherein
"m" spectral bands are in the first wavelength band, each of the "m" spectral bands has a predetermined bandwidth, "n" spectral bands are in the second wavelength band, each of the "n" spectral bands has the predetermined wavelength, and
$m<n$.

4. The operating method of an optical filter according to claim 3, wherein
defining a holding period $\Delta tm$ per spectral band when the spectral band of the first variable wavelength bandpass filter is changed "m" times, and a holding period $\Delta tn$ per spectral band when the spectral band of the second variable wavelength bandpass filter is changed "n" times, and $\Delta tm > \Delta tn$ is satisfied.

5. The operating method of an optical filter according to claim 4, wherein
$m \times \Delta tm = n \times \Delta tn$ is satisfied.

6. The operating method of an optical filter according to claim 1, further comprising:
exiting a seventh light of a third wavelength band from a third variable wavelength bandpass filter,
the third wavelength band being located on a longer wavelength side of the second wavelength band,
a bandwidth of the third wavelength band being wider than a bandwidth of the second wavelength band,
"s" spectral bands being in the third wavelength band, each of the "s" spectral bands having a predetermined bandwidth,
"m" spectral bands being in the first wavelength band, each of the "m" spectral bands having the predetermined bandwidth,
"n" spectral bands being in the second wavelength band, each of the "n" spectral bands having the predetermined bandwidth,
$m < n \leq s$ or $m \leq n < s$, and
$m = m+1$ when $m<n$ or $s=n+1$ when $n<s$ being satisfied.

7. The operating method of an optical filter according to claim 1, wherein
the optical filter is an etalon.

* * * * *